(12) United States Patent
Boyer et al.

(10) Patent No.: US 8,539,044 B2
(45) Date of Patent: Sep. 17, 2013

(54) ON-LINE SCHEDULE SYSTEM WITH PERSONALIZATION FEATURES

(75) Inventors: Franklin E. Boyer, Cleveland, OK (US); Mark A. Regouby, Tulsa, OK (US); Timothy B. Demers, Tulsa, OK (US)

(73) Assignee: United Video Properties, Inc., Tulsa, OK (US)

( * ) Notice: Subject to any disclaimer, the term of this patent is extended or adjusted under 35 U.S.C. 154(b) by 538 days.

(21) Appl. No.: 12/173,690

(22) Filed: Jul. 15, 2008

(65) Prior Publication Data

US 2008/0275914 A1 Nov. 6, 2008

Related U.S. Application Data

(63) Continuation of application No. 11/604,992, filed on Nov. 28, 2006, now abandoned, which is a continuation of application No. 09/437,304, filed on Nov. 9, 1999, now Pat. No. 7,165,098.

(60) Provisional application No. 60/107,802, filed on Nov. 10, 1998.

(51) Int. Cl.
*G06F 15/16* (2006.01)

(52) U.S. Cl.
USPC ............ 709/219; 709/203; 709/217; 709/218

(58) Field of Classification Search
USPC ........... 709/203, 217, 218, 219, 224; 725/40, 725/46, 50
See application file for complete search history.

(56) References Cited

U.S. PATENT DOCUMENTS

| | | | |
|---|---|---|---|
| 5,534,911 A | 7/1996 | Levitan | |
| 5,550,576 A | 8/1996 | Klosterman | |
| 5,589,892 A | 12/1996 | Knee et al. | |
| 5,596,373 A | 1/1997 | White et al. | |
| 5,629,733 A | 5/1997 | Youman et al. | |
| 5,721,827 A | 2/1998 | Logan et al. | |
| 5,774,664 A | 6/1998 | Hidary et al. | |
| 5,778,181 A | 7/1998 | Hidary et al. | |
| 5,790,202 A | 8/1998 | Kummer et al. | |
| 5,828,839 A | 10/1998 | Moncreiff | |

(Continued)

FOREIGN PATENT DOCUMENTS

| EP | 0 723 369 A1 | 7/1996 |
|---|---|---|
| EP | 0 848 554 A2 | 6/1998 |

(Continued)

OTHER PUBLICATIONS

"UVSG Teams With Microsoft on Internet Information Server," press release of United Video Satellite Group (Feb. 22, 1996).
"UVSG Offers System-Specific Web Site Development for OPS," press release of United Video Satellite Group (Apr. 12, 1996).
"Set-Top Box Control Software: A Key Component in Digital Video," In Philips Journal of Research, Rath et al. (1996).

(Continued)

*Primary Examiner* — Quang N Nguyen
(74) *Attorney, Agent, or Firm* — Ropes & Gray LLP

(57) ABSTRACT

An on-line scheduling application allows users to personalize how television-related, entertainment-related, and social event related information is provided. Users may select one or more sources from which the information is obtained. Users may set up a date book that is also uses as a source. Users may select one or more delivery schemes that the application uses to provide the information. One or more of the personalization features of the scheduling application may be incorporated into an on-line television programming guide.

23 Claims, 28 Drawing Sheets

(56) References Cited

U.S. PATENT DOCUMENTS

| | | | |
|---|---|---|---|
| 5,828,945 | A | 10/1998 | Klosterman |
| 5,848,396 | A * | 12/1998 | Gerace ............................ 725/46 |
| 5,850,218 | A | 12/1998 | LaJoie et al. |
| 5,855,006 | A | 12/1998 | Huemoeller et al. |
| 5,933,778 | A * | 8/1999 | Buhrmann et al. ............ 455/461 |
| 5,973,683 | A | 10/1999 | Cragun et al. |
| 5,974,406 | A * | 10/1999 | Bisdikian et al. ..................... 1/1 |
| 5,983,227 | A | 11/1999 | Nazem et al. |
| 5,988,078 | A | 11/1999 | Levine |
| 6,005,565 | A | 12/1999 | Legall et al. |
| 6,052,145 | A * | 4/2000 | Macrae et al. .................. 725/50 |
| 6,061,719 | A | 5/2000 | Bendinelli et al. |
| 6,078,348 | A * | 6/2000 | Klosterman et al. ............ 725/40 |
| 6,085,242 | A | 7/2000 | Chandra |
| 6,161,112 | A | 12/2000 | Cragun et al. |
| 6,172,677 | B1 * | 1/2001 | Stautner et al. ............... 715/716 |
| 6,205,485 | B1 | 3/2001 | Kikinis |
| 6,209,007 | B1 | 3/2001 | Kelley et al. |
| 6,278,449 | B1 | 8/2001 | Sugiarto et al. |
| 6,356,956 | B1 | 3/2002 | Deo et al. |
| 6,388,714 | B1 * | 5/2002 | Schein et al. .................. 348/563 |
| 6,871,220 | B1 * | 3/2005 | Rajan et al. .................... 709/224 |
| 7,072,932 | B1 * | 7/2006 | Stahl ............................... 709/219 |
| 7,165,098 | B1 | 1/2007 | Boyer et al. |
| 2002/0026496 | A1* | 2/2002 | Boyer et al. ................... 709/218 |
| 2007/0101006 | A1 | 5/2007 | Boyer et al. |

FOREIGN PATENT DOCUMENTS

| | | |
|---|---|---|
| EP | 0 854 645 A2 | 7/1998 |
| WO | WO 96/27989 | 9/1996 |
| WO | WO 96/38962 | 12/1996 |
| WO | WO 97/13368 | 4/1997 |
| WO | WO 97/42763 | 11/1997 |
| WO | WO 98/26584 | 6/1998 |
| WO | WO 98/43183 | 10/1998 |
| WO | WO 99/14953 | 3/1999 |
| WO | WO 99/15968 | 4/1999 |

OTHER PUBLICATIONS

The clickTV television program guide website of TVData of Queensbury, New York bearing a copyright date of 1997. This website is located at www.clicktv.com (as printed from the Internet on Aug. 13, 1997).

The television program guide website of Gist Communications, Inc. of New York, New York bearing a copyright date of 1997. This website is located at www.gist.com (as printed from the Internet on Aug. 14, 1997).

The television program guide website of TV Guide Entertainment Network bearing a copyright date of 1997. This website is located at www.tvguide.com (as printed from the Internet on Aug. 14-22, 1997).

The InfoBeat program guide website of InfoBeat, Inc. bearing a copyright date of 1997. This website is located at www.infobeat.com (as printed from the Internet on Dec. 8, 1997).

The InfoBeat program guide website of InfoBeat, Inc. bearing a copyright date of 1998. This website is located at www.infobeat.com (as printed from the Internet on Sep. 1, 1998).

The television program guide website of TV Guide Entertainment Network. This website is located at www.tvgen.com (as printed from the Internet on Sep. 1, 1998).

The television program guide website of Gist Communications, Inc. of New York, New York bearing a copyright date of 1998. This website is located at www.gist.com (as printed from the Internet on Sep. 1, 1998).

The clickTV television program guide website of TVData of Queensbury, New York bearing a copyright date of 1998. This website is located at www.clicktv.com (as printed from the Internet on Sep. 1, 1998).

The MyCalendar website. This website is located at www.mycalendar.com bearing copyright dates of 1997-1999 (as printed from the Internet Oct. 26-27, 1999).

The MyYahoo website. This website is located at edityahoo.com (as printed from the Internet Oct. 26-27, 1999).

* cited by examiner

950

ACTIVE DISPLAY ELEMENT | YOUR TELEVISION RELATED REQUESTS

OK

SOURCES: THEATRES, TICKETS.COM, SIDEWALK.COM

| | TITLE | WORDS | VENUE | TYPE | GENRE | DAY OF WEEK | RATING |
|---|---|---|---|---|---|---|---|
| 901 | (ALL) | CHRISTMAS | RADIO CITY, MADISON SQUARE.... | THEATRE | MUSICAL | SAT. | (ALL) |
| 903 | (ALL) | MOZART | AVERY FISHER.... | CONCERT | (ALL) | THURS. | 7:00P |
| 905 | ELTON JOHN | (ALL) | RADIO CITY, MADISON SQUARE.... | CONCERT | (ALL) | FRI. | (ALL) |
| 807 | YANKEES | (ALL) | NEW YORK | SPORTING EVENTS | BASEBALL | FRI., SAT. | (ALL) |

ACTIVE DISPLAY ELEMENT

HAVE THE HTML VERSION OF YOUR REQUEST RESULTS PAGE SENT DIRECTLY TO YOU.

HOW WOULD YOU LIKE YOUR INFORMATION DELIVERED?

☐ CONTINUOUS

☐ E-MAIL DELIVERY

☑ HTML MAIL DELIVERY

☑ PAGER/DIGITAL PHONE REMINDER

☐ PAGER/DIGITAL PHONE NOTIFICATION

FINISH

| REQ. # | CRITERIA | SEARCH WITHIN | OUTPUT | MATCHES |
|---|---|---|---|---|
| 1 | ACTOR JERRY SEINFELD, GENRE COMEDY, AIRING ON CHANNEL 23 FOX KOKI OR ON CHANNEL 3 COMEDY CHANNEL, STARTING BETWEEN 6:30 PM AND 8:30 PM. | TV LISTINGS, MOVIE DATABASE, FEATURES TV GUIDE, STORE | HTML MAIL DELIVERY PAGER/DIGITAL PHONE REMINDER | 6 |
| 2 | GENRE OUTDOOR, TITLE HUNTING, WORDS HUNTING | TV LISTINGS, MOVIE DATABASE, FEATURES TV GUIDE, STORE | HTML MAIL DELIVERY PAGER/DIGITAL PHONE REMINDER | 0 |
| 3 | GENRE SPORTS, TITLE NASCAR, WORDS NASCAR | TV LISTINGS, MOVIE DATABASE, FEATURES TV GUIDE, STORE | HTML MAIL DELIVERY PAGER/DIGITAL PHONE REMINDER | 0 |
| 4 | ACTION BRUCE WILLIS OR SYLVESTER STALLONE, GENRE ACTION, STARTING BETWEEN 7:00 PM AND 11:00 PM. | TV LISTINGS, MOVIE DATABASE, FEATURES TV GUIDE, STORE | HTML MAIL DELIVERY PAGER/DIGITAL PHONE REMINDER | 0 |
| 5 | GENRE MUSICAL, TYPE THEATRE, AT RADIO CITY OR MADISON SQUARE GARDEN, ON SATURDAY, WORDS CHRISTMAS. | TV LISTINGS, MOVIE DATABASE, FEATURES TV GUIDE, STORE | HTML MAIL DELIVERY PAGER/DIGITAL PHONE REMINDER | 0 |

MODIFY    DELETE

FIG. 17B

| REQ. # | CRITERIA | SEARCH WITHIN | OUTPUT | MATCHES |
|---|---|---|---|---|
| 6 | TYPE CONCERT, AT AVERY FISCHER HALL, ON THURSDAYS STARTING AT 7:00 PM, WORDS MOZART. | TV LISTINGS, MOVIE DATABASE, FEATURES TV GUIDE, STORE | HTML MAIL DELIVERY PAGER/DIGITAL PHONE REMINDER | 1 |
| 7 | TYPE CONCERT, AT RADIO CITY OR MADISON SQUARE GARDEN, ON FRIDAY, TITLE ELTON JOHN | TV LISTINGS, MOVIE DATABASE, FEATURES TV GUIDE, STORE | HTML MAIL DELIVERY PAGER/DIGITAL PHONE REMINDER | 1 |
| 8 | TYPE SPORTING EVENTS, GENRE BASEBALL, FRIDAYS OR SATURDAYS IN NEW YORK, TITLE YANKEES | TV LISTINGS, MOVIE DATABASE, FEATURES TV GUIDE, STORE | HTML MAIL DELIVERY PAGER/DIGITAL PHONE REMINDER | 1 |
| 9 | GENRE HOBBIES, WORDS AUTOMOBILE OR CAR, IN SUFFOLK COUNTY | BSA.SCOUTING.ORG HOBBIES CHURCH SCHEDULES | HTML MAIL DELIVERY PAGER/DIGITAL PHONE REMINDER | 1 |

[MODIFY] [DELETE]

*FIG. 17c*

ACTIVE DISPLAY ELEMENT — 102

TV — 1920
TV — 1905
TV LISTINGS

THURSDAY'S SCHEDULE

ENTERTAINMENT — 1905  SOCIAL — 1905
CURRENT LINEUP: COX SAN DIEGO  1907 — SWITCH LINEUP

| REQ. # | TIME | CHANNEL NAME | CHANNEL # | TITLE | ATTRIBUTES |
|---|---|---|---|---|---|
| 1 | 8:00 P.M. | KOKI | 23 | SEINFELD | GRAPHIC |

1920
FEATURES & NEWS

| REQ. # | MATCHING KEYWORD | FEATURE TITLE | LOCATION ON SITE | PUBLICATION DATE |
|---|---|---|---|---|
| 1 | TITLE: SEINFELD | "SEINFELD" DIRECTOR GETS NEW GIG | | 12/1/98 |

1917

1920
MERCHANDISE

| REQ. # | MATCHING KEYWORD | | ITEM DESCRIPTION | PRICE |
|---|---|---|---|---|
| 1 | TITLE: SEINFELD | GRAPHIC | SEINFELD PILOT AND FINALE COLLECTORS VIDEO SET – ORDER NOW AND RECEIVE A FREE SEINFELD COLLECTORS EDITION CEREAL BOWL. | $19.99 |

1917

1920
ENTERTAINMENT — 1905
THEATRE

| REQ. # | TITLE | DESCRIPTION | VENUE | START TIME |
|---|---|---|---|---|
| 6 | MOSTLY MOZART FESTIVAL | SELECTIONS FROM MOZART'S... | AVERY FISHER HALL | 7:00 P.M. THURS. |

ACTIVE DISPLAY ELEMENT — 102

THIS WEEK'S SCHEDULE

MERCHANDISE

| REQ. # | MATCHING KEYWORD | | ITEM DESCRIPTION | PRICE |
|---|---|---|---|---|
| 1 | TITLE: SEINFELD | GRAPHIC | SEINFELD PILOT AND FINALE COLLECTORS VIDEO SET -- ORDER NOW AND RECEIVE A FREE SEINFELD COLLECTORS EDITION CEREAL BOWL. | $19.99 |
| 8 | TITLE: YANKEES | GRAPHIC | YANKEE JERSEY | $49.99 |

1917

ENTERTAINMENT — 1905

| REQ # | TITLE | DESCRIPTION | VENUE | START TIME |
|---|---|---|---|---|
| 7 | ELTON JOHN IN CONCERT | ELTON JOHN IN CONCERT | MADISON SQUARE GARDEN | 7:00 P.M. FRI. |
| 8 | YANKEES VS. RED SOX | N.Y. YANKEES VS. BOSTON RED SOX | YANKEE STADIUM | 5:00 P.M. FRI. |

ACTIVE DISPLAY ELEMENT — 102

THIS MONTH'S SCHEDULE

ENTERTAINMENT — 1905

| REQ # | TITLE | DESCRIPTION | VENUE | START TIME |
|---|---|---|---|---|
| 7 | ELTON JOHN IN CONCERT | ELTON JOHN IN CONCERT | MADISON SQUARE GARDEN | 7:00 P.M. FRI. |
| 8 | YANKEES VS. RED SOX | N.Y. YANKEES VS. BOSTON RED SOX | YANKEE STADIUM | 5:00 P.M. FRI. |

— 1920

SOCIAL — 1905

| REQ # | TITLE | DESCRIPTION | VENUE | START TIME |
|---|---|---|---|---|
| 9 | SUFFOLK CHEVY | MEETING FOR CHEVY COLLECTIONS | SUFFOLK | 5:00 P.M. SUNDAY |
| 11 | FIRST BAPTIST | SUNDAY SERVICE SCHEDULE | WESTBURY | 10:30 A.M. SUNDAY |

PRIMARY TEST COLOR: BLUE
ANCHOR TEXT COLOR: YELLOW
PRIMARY TEXT FONT: COURIER NEW
ANCHOR TEXT FONT: NORMAL
PRIMARY TEXT STYLE: NORMAL
ANCHOR TEXT STYLE: NORMAL

FAVORITES FIRST: NO

DESTINATIONS

ANCHOR TYPE          PAGE

LISTING              INFORMATION

FIG. 21

ON-LINE SCHEDULE SYSTEM WITH PERSONALIZATION FEATURES

This application is a continuation of U.S. patent application Ser. No. 11/604,992 filed Nov. 28, 2006, now abandoned, which is a continuation of U.S. patent application Ser. No. 09/437,304, filed Nov. 9, 1999, now U.S. Pat. No. 7,165,098, issued Jan. 16, 2007, which claims the benefit of U.S. Provisional Patent Application No. 60/107,802, filed Nov. 10, 1998.

BACKGROUND OF THE INVENTION

This invention relates to on-line television programming, entertainment, and social activity information systems.

On-line interactive television program guides have been developed in which users may access a web site with their personal computer or Internet-enabled set-top box to obtain program listings and other program-related information. The Internet also provides users with the ability to access information on entertainment and social activities. Users may use the Internet to access entertainment and activity-related web sites that do not generally include television program listings. Users may, for example, access web sites to obtain schedules for sporting events, in-theater movies, live shows, church services, or schedules for other entertainment events or social activities in which the users are interested. The large amount of available television-related, entertainment-related, and social-activity-related information available on-line may tend to overload users. Users must typically weed through large amounts of undesired information to access information of interest.

It is therefore an object of the present invention to provide an on-line scheduling application that users may personalize to obtain television, entertainment, and social-activity-related information.

SUMMARY OF THE INVENTION

This and other objects of the present invention are accomplished in accordance with the principles of the present invention by providing an on-line scheduling application, such as an on-line television program guide. Users may personalize the on-line scheduling application and use it as a single on-line portal to television-related information and non-television-related information, such as entertainment-related information and social-activity-related information in which they are interested. Television-related, entertainment-related, and social-activity-related information, is sometimes referred to herein as "scheduling information."

The on-line scheduling application of the present invention may provide users with an opportunity to personalize scheduling information by, for example, setting criteria based on titles, keywords (i.e., any word which appears in a title or description such as television program title or description, movie title, or feature keyword), actors, genres, ratings, times of day, days of the week, channels, price, venue, any other suitable criteria, or any suitable combination thereof. The scheduling application may only provide scheduling information that meets any one of or a combination of these criteria.

The on-line scheduling application may also provide users with an opportunity to select the sources of information that the scheduling application uses. Users may, for example, personalize the application to obtain scheduling information from a number of different databases. Users may desire that the scheduling application obtain, for example, television-related information from one or more databases, such as a program listings database, a certain movies database, features database, or merchandise database. Users may desire that the scheduling application obtain, for example, schedule information for museum events from a database associated with particular museums, theater information from one or more theater databases, church information from certain church databases, hobby information from a hobbies database, or any other desired information from a suitable database or databases. Users may also select certain web sites from which the scheduling application obtains scheduling information. The scheduling application may provide users with separate opportunities to select one or more sources and to select genres or other suitable criteria. By separating the selection of sources and criteria, users are provided with enhanced flexibility in the manner of personalizing their television-related and non-television-related scheduling information.

Users may personalize the on-line scheduling application so that the application provides scheduling information sorted in a manner suitable to the user. Users may, for example, choose to access scheduling information sorted alphabetically, by genre, by time or date, or according to any other suitable sorting criteria. In an on-line television program guide, for example, users may personalize the guide to display favorite program listings at the top of a program listings list or grid. Program listings and schedule information for entertainment events and social activities may be provided as part of the same web page, thereby simplifying the user's access to this information.

Users may personalize the on-line scheduling application by selecting one or more schemes for delivering scheduling information to the user. Users may, for example, access personalized scheduling information each time the on-line application is accessed. Alternatively, users may elect to automatically receive scheduling information reminders by, for example, continuous delivery, regular e-mail, HyperText Markup Language (HTML) e-mail, pager, digital phone, continuous data feed or by any other suitable method. In an on-line television program guide, for example, users may elect to receive personalized television program listings delivered via HTML mail every morning.

The on-line scheduling application may also provide users with an opportunity to personalize the display settings of the on-line application. Users may, for example, personalize the graphical attributes of on-line display screens, such as web pages. Users may, for example, set the primary text color, anchor text color, primary text font, anchor text font, primary text style, anchor text style, or any other suitable graphical attribute of the display screen. Users may also select anchor destinations. In an on-line television program guide, for example, users may elect to go to a program information page after selecting a listing, or may elect to go to some other suitable page.

If desired, the on-line scheduling application may maintain user histories and users may be targeted with reminders. Reminders may be based, for example, on the types of personalization criteria users select, on products users order, or based on any other suitable condition. For example, reminders may indicate to users that there are upcoming shows of a genre the user is interested in or that other users have watched who have similar interests. Alternatively, the on-line scheduling application may remind users of other types of events. If a user indicates that the user is interested in cars for example, the user may receive a reminder each fall reminding the user to flush his or her car's radiator and replace the engine coolant. The user may select the delivery mechanism to be used for such reminders.

Further features of the invention, its nature and various advantages will be more apparent from the accompanying drawings and the following detailed description of the preferred embodiments.

BRIEF DESCRIPTION OF THE DRAWINGS

FIG. 11 shows an illustrative entertainment requests summary page in accordance with the principles of the present invention.

FIG. 15 shows an illustrative delivery page in accordance with the principles of the present invention.

FIGS. 17a, 17b, and 17c show illustrative request setup pages in accordance with the principles of the present invention.

FIGS. 20a, 20b, and 20c show illustrative results pages for the current day, week, and month respectively, in accordance with the principles of the present invention.

FIG. 21 shows an illustrative display setup page in accordance with the principles of the present invention.

DETAILED DESCRIPTION OF THE PREFERRED EMBODIMENTS

Figure 1:
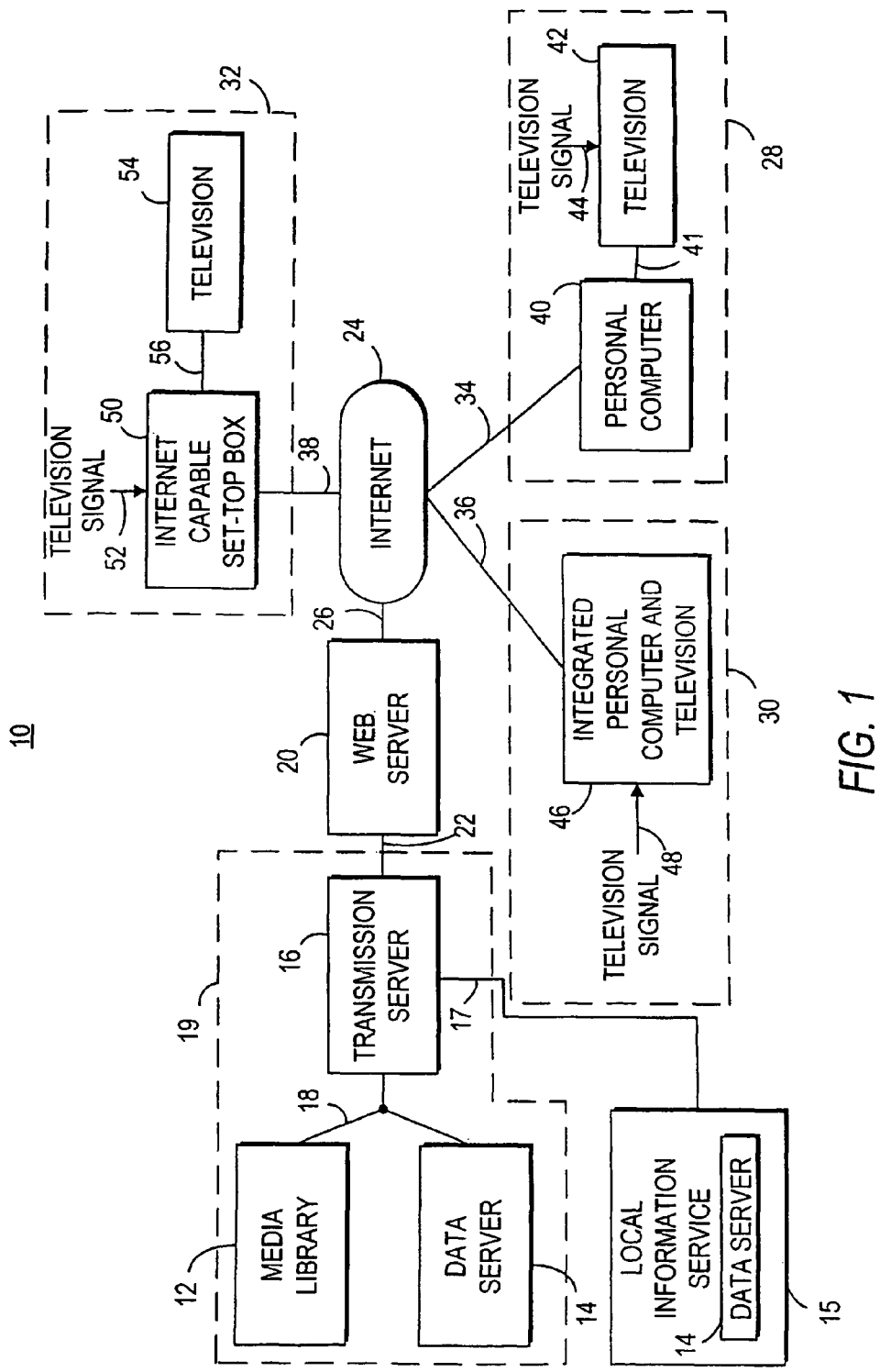
FIG. 1 is a system diagram showing a media library and data server interconnected with a web server and various multimedia systems.

An Internet scheduling application system 10 is shown in FIG. 1. Scheduling system 19 may be any suitable computer system for obtaining scheduling information and providing the information to users via the Internet 24. Scheduling system 19 may include, for example, media library 12, data server 14, network 18, and transmission server 16. There may be multiple scheduling systems 19 but only one has been shown to avoid over-complicating the drawing. A different scheduling system 19 may be used, for example, for the different types of scheduling information provided to users by a scheduling application running on scheduling system 10. Alternatively, there may be one or more scheduling application systems 19 that provide scheduling information for a combination of different applications. In practice, a scheduling application may run partly on scheduling system 19 and partly on web server 20. Web server 20 may act as a front-end and provide, for example, a web-based interface to users via Internet 24. Web server 20 and scheduling: system 19 may exchange data using any suitable approach over communications line 22.

Scheduling information may include any suitable textual, graphical, video, or audio multimedia. Scheduling information may be television programming related, entertainment-related, social-activity-related, or any suitable combination thereof. Television programming related information may be any suitable information related to television programming and may include, for example, program identifiers, times, channels, titles, descriptions, categories, merchandise information, or any other suitable television-programming-related information.

Entertainment-related information may be, for example, any information related to movies, theatrical productions, concerts, music, sporting events, or other types of entertainment that users may be interested in. Entertainment-related information may include event identifiers, times, venues, titles, descriptions, categories, merchandise information, or any other suitable event-related information.

Social-activity-related information may be information regarding any other type of event users may attend for spiritual, academic, or other purposes other than primarily for entertainment. This may include, for example, church meetings, classes, Boy Scout or Girl Scout events, clubs, or any other suitable social activity. Social-activity-related information may include, for example, event identifiers, times, venues, titles, descriptions, categories, merchandise information, or any other suitable activity-related information.

Scheduling system 19 may include media library 12 and data server 14. Media library 12 preferably contains an array of compact disc read only memory (CD-ROM) disks, digital video disks (DVDs), or other suitable media for storing multimedia content. The multimedia stored in media library 12 is primarily video-based. Media library 12 may contain, for example, television programming clips and related interviews and reviews, video clips of sporting events (major league, minor league, college level, high-school level, local-level, etc.), video clips of classes, or any other suitable multimedia content depending on the application for which scheduling information is provided.

Scheduling system 19 may also include data server 14. Data server 14 may maintain one or more databases of scheduling information suitable for the application that is being provided. For example, data server 14 may have a media database containing descriptions of videos in media library 12. Data server 14 may also have a database containing television program listings, a movie database containing information regarding new releases of movies, a features database containing information regarding editorial features, and a merchandising database containing merchandise descriptions and ordering information. Data server 14 may, for example, have a cable system operator database containing channel lineups, information on the time zone of the operator, weather data for the operator's region, data on the zip codes in the cable system operator's area, etc. The scheduling information in data server 14 is primarily in non-video formats. Other databases may be supported by data server 14, as desired. If, for example, a scheduling system 19 provides scheduling information for local sporting events, data server 14 may maintain a database of teams, players, their statistics, game times, venues, etc.

Scheduling system 19 may also maintain databases of scheduling information for applications other than the one to which the given scheduling system 19 is primarily responsible for. In such an approach, a particular scheduling application may act as the entryway through which users may manage different types of on-line scheduling information. If, for example, a particular scheduling system 19 provides an on-line television program guide application, users may personalize the on-line guide to provide scheduling information from other scheduling systems 19. Users may, for example, use an on-line television program guide to view favorite television programming related information along with favorite theatrical and local sporting events scheduling information. Users may also view local church, school, club, or lodge schedules.

Scheduling information from different systems may be obtained by the scheduling application using any suitable approach. The scheduling application may obtain scheduling information using, for example, known web crawling and searching techniques. Data obtained by the application may be maintained in a central database. Alternatively, a central database maintained by scheduling system 19 may be updated by remote databases (e.g., databases at local service system 15) using a suitable database engine. Remote databases may be replicated by scheduling system 19. A suitable database engine for this approach may include, for example, Lotus Notes by Lotus Development Corporation.

Media library 12 and data server 14 may be interconnected with transmission server 16 via internal network 18. Media library 12, data server 14, network 18, and transmission server 16 may make up scheduling system 19. If desired, the data and multimedia storage and processing functions of media library 12, data server 14, and transmission server 16 may be provided by a single, integrated system. Scheduling information may, for example, be stored on data server 14 in a relational database format and may be stored on transmission server 16 in an object-oriented database format. A building process implemented in the C++ programming language can be used to periodically (e.g., once a day) build a temporary data set of scheduling information (e.g., a seven-day to one-month data set) for storage on transmission server 16.

Transmission server 16 may also receive local television-related data, local entertainment-related data, local social event related data, or any suitable combination thereof, from local information service 15. Local information service 15 may be any suitable facility for obtaining data particular to a localized region and providing the data to transmission server 16 via link 17. Local information service 15 may be, for example, a local weather station that monitors the local weather, a local newspaper that obtains local information such as high school and college sports information, or any other suitable provider of information. Local information service 15 may be, for example, a local business with a computer for providing the scheduling information. If desired, local information service 15 may provide the scheduling information via Internet 24 to transmission server 16. There may be a number of local information services but only one has been shown to avoid overcomplicating the drawing.

Scheduling information and related data may be transferred from transmission server 16 to web server 20 via communications line 22. Communications line 22 may be part of an internal network or may be a standard dedicated communications line. Web server 20 can be connected to the Internet 24 via communications link 26. Communications link 26 is preferably a telephone line or other suitable Internet communications path, such as a coaxial television cable signal path, a hybrid fiber/coaxial television cable path, a satellite communications path, a broadcast communications path, other suitable communications paths, or a combination of such paths.

If transmission server 16 and web server 20 are separate devices, as shown in FIG. 1, transmission server 16 can be used as a common data processing facility for other applications which use the type of television program data stored on transmission server 16. If desired, the functions of transmission server 16 and web server 20 can be integrated in a single machine.

Web server 20 may use standard protocols such as the TCP/IP (Transmission Control Protocol/Internet Protocol) and the HyperText Transfer Protocol (HTTP) to make the scheduling information available over the Internet 24 to users at multimedia systems 28, 30, and 32 via communications links 34, 36, and 38. Communications links 34, 36, and 38 are Internet links formed from telephone links, radio-frequency (RF) links, cable modem links, satellite dish links, combinations of links such as these, or any other suitable connection link.

The scheduling application may include software running both on scheduling system 19 and web server 20. In this approach, various modules or components of the application may be dedicated to performing the tasks associated with system 19 and server 20 (e.g., database management, web service, etc.). In an alternative approach, the scheduling application may run on web server 20 and issue data requests to database server software running on system 19, while also acting as a front-end web server to multimedia systems 28, 30 and 32. In still another approach, the allocation of hardware and software functionality of scheduling application system 10 may be integrated into a single system that provides both web services and data services, if desired.

Multimedia system 28 has personal computer 40 and may have television 42. Certain scheduling application features, such as on-line television program guide features, may require that personal computer 40 be able to control television 42 via link 41, which may be, e.g., an infrared communications link. Link 41 allows personal computer 40 to tune television 42 using control signals. Television 42 may receive television signals from input 44. The television signals received by input 44 and the other television signal inputs shown in FIGS. 1-3 may be provided by cable television, satellite television, broadcast television, a combination of such sources, or any other suitable source of television programming signals. In an alternative approach, transmission server 16 may receive television programming via input 17. The television programming may be delivered over Internet 24 by web server 20. In this approach, personal computer 40 may provide the television programming to television 42 for display. Internet access for multimedia system 28 is provided via Internet communications link 34.

Multimedia system 30 may have an integrated personal computer and television 46, such as the Gateway 2000 Destination® PC-TV hybrid available from Gateway 2000 Inc. of North Sioux City, S. Dak. Television signals may be provided at input 48, or may be delivered via the Internet and communications link 36. Internet access is provided via communications link 36.

Multimedia system 32 has an Internet capable set-top box 50. Set-top box 50 may use the TV OnLine® set-top box application software of World Gate Corporation, which may be implemented on set-top boxes such as the DCT-5000® of General Instrument Corporation of Hatboro, Pa. and the 8600x® of Scientific Atlanta of Atlanta, Ga. Set-top box 50 may receive television signals via input 52. Internet access is provided via Internet communications link 38. Video display signals containing television and Internet information are provided to television 54 by line 56. In an alternative approach, television programming may be delivered by web server 20 via the Internet and communications link 38.

During operation of system 10, certain data processing functions, such as user-initiated searches and sorts, are typically performed on web server 20 or scheduling system 19. If desired, such functions can be performed on a suitable data processing component in multimedia systems 28, 30, and 32.

Figure 2:
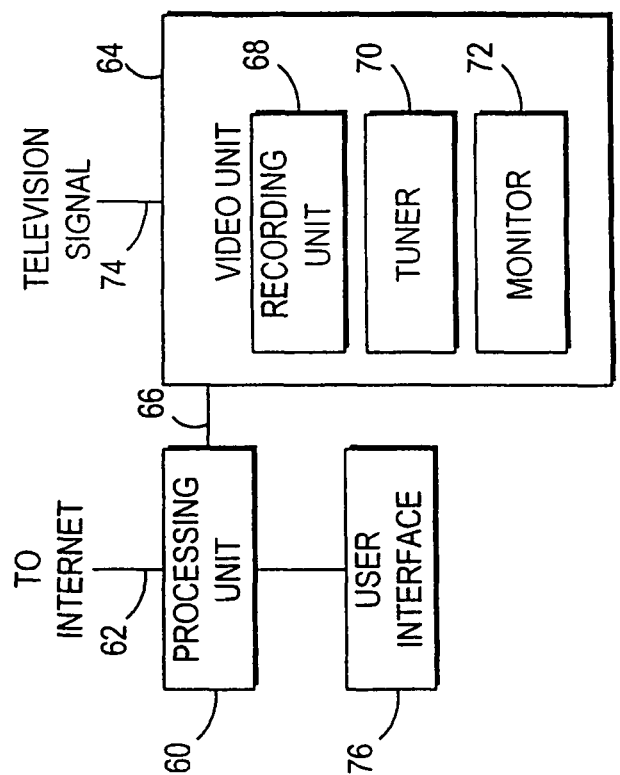
FIG. 2 is a generalized diagram of a user's multimedia system.

Certain scheduling application functions require only that multimedia systems 28, 30, and 32 contain web browsing capabilities. Other functions require television tuning and video recording capabilities, such as when the scheduling application is an on-line television program guide. FIG. 2 shows a generalized multimedia system arrangement that is capable of supporting controlled television tuning and video recording, if desired. As shown in FIG. 2, multimedia system 58 has a processing unit 60, which preferably contains memory for storing instructions and a microprocessor for executing the instructions. Processing unit 60 accesses the Internet via Internet link 62. Video unit 64, which may be connected to processing unit 60 by communications line 66, may contain recording unit 68, tuner 70, and monitor 72. Television signals may be received at input 74 or from the Internet at input 62.

Tuner 70 may be used to select television programs from television signals on input 74 for viewing or recording. Tuner 70 may be controlled under the direction of control signals provided by processing unit 60 over communications link 66. Television signals and Internet information can be viewed using monitor 72. Recording unit 68 allows the user to make videocassette recordings of television programs. Recording unit 68 may also be controlled by control signals from processing unit 60.

The operation of processing unit 60 is determined based on the execution of instructions stored in memory in processing unit 60 and on control inputs received from the user via user interface 76. Suitable user interfaces include handheld infrared remote controls, keyboards, pointing devices, and voice recognition devices.

Multimedia systems such as multimedia system 58 of FIG. 2 may be used in place of multimedia systems 28, 30, and 32. Alternatively, systems such as systems 28, 30, and 32 may be modified to incorporate features like those shown multimedia system 58. For example, if it were desired to provide a multimedia system with circuitry to handle video recording, video recording units (such as recording unit 68) could be provided in systems such as multimedia systems 28, 30, and 32. In addition, in systems such as system 58, certain components may be used more than once (e.g., tuner 70 may be contained within both a television component and a videocassette recorder component in system 58).

Regardless of the specific configuration of the multimedia systems used in system 10, the user of such a multimedia system has the capability to access scheduling information on web server 20. Many of the features of the on-line scheduling application are available using multimedia systems with the capabilities of a modern personal computer (desktop or laptop). If it is desired to use certain scheduling application features that rely upon controlling a tuner or recording unit such as in an on-line television programming guide, the multimedia system should also have the ability to tune to a desired television program from among the various television programs provided at inputs 44, 48, 52, and 74 and have the ability to record that program automatically, under the control of commands from processing unit 60.

Figure 3:
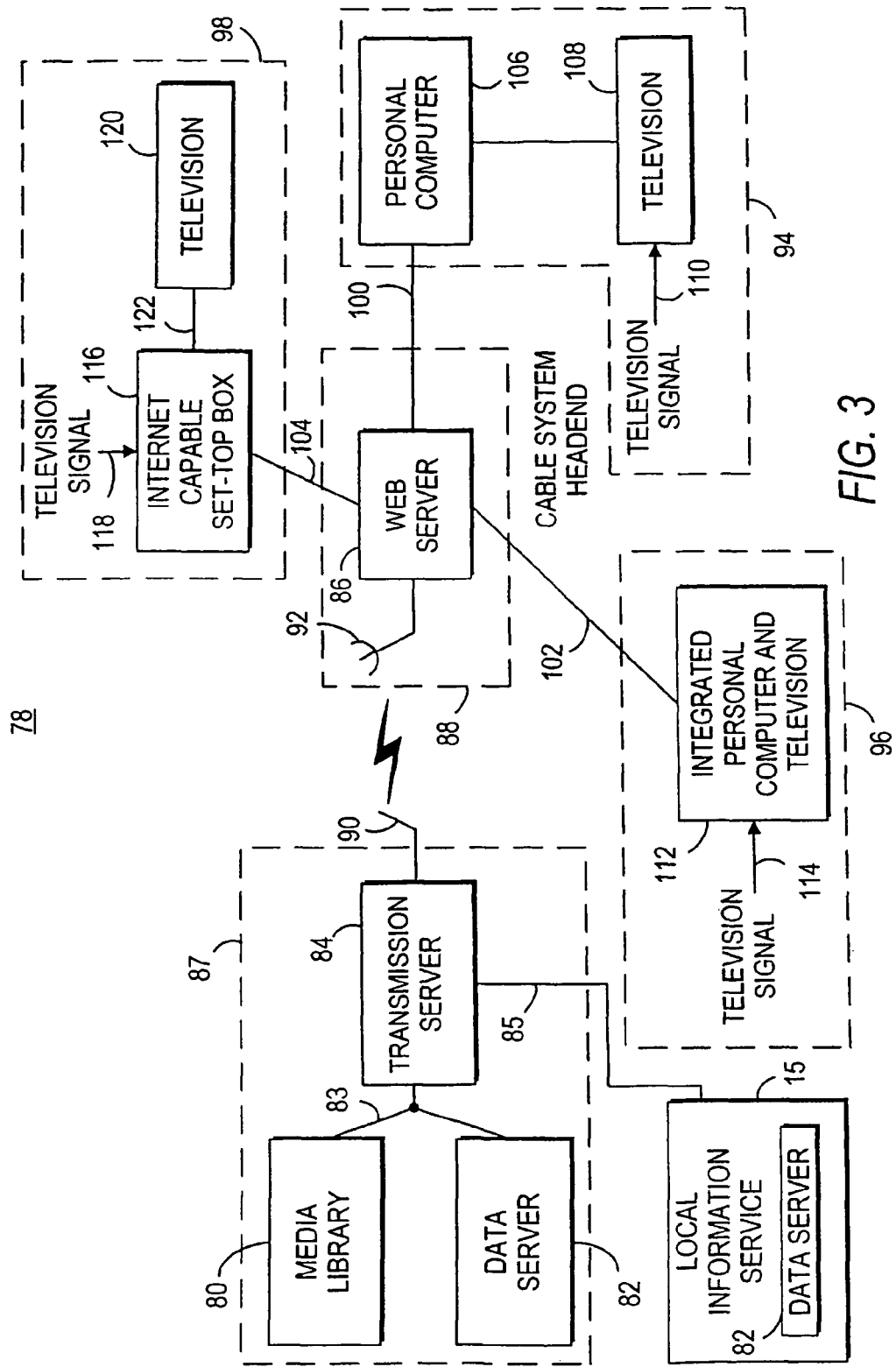
FIG. 3 is a system diagram similar to that of FIG. 1 showing an arrangement in which the web server is located in a cable system headend.

FIG. 3 shows an illustrative configuration for an on-line television program guide system. As shown in FIG. 3, guide scheduling system 87 has media library 80 and data server 82. Media library 80 contains television program clips, interviews, and reviews. The scheduling information stored in media library 80 is primarily video. Data server 82 contains databases of scheduling information. For example, data server 82 may have a database containing descriptions of videos in media library 80. Data server 82 may also have a database or databases containing information on program titles, pay-per-view events, and television program schedules. Data server 82 may have a cable system operator database containing channel lineups, information on the time zone of the operator, weather data for the operator's region, data on the zip codes in the cable system operator's area, etc. Other databases may also be supported by data server 82. The scheduling information in data server 82 is mainly in formats other than video.

Media library 80 and data server 82 are interconnected with transmission server 84 via internal network 83. Media library 80, data server 82, and internal network 83 make up guide scheduling system 87. Scheduling information may be stored on data server 82 in a relational database format and may be stored on transmission server 84 in an object-oriented database format. A building process implemented in the C++ programming language may be used to periodically (e.g., once a day) build a temporary data set of scheduling information (e.g., a seven-day to one-month data set) for storage on transmission server 84.

Transmission server 84 may also receive local television-related information, local entertainment-related information, local social event related information, or any suitable combination thereof, from local information service 15. Local information service 15 may be any suitable facility for obtaining data particular to a localized region and providing the data to transmission server 84 via link 85. Local information service 15 may be, for example, a local weather station that monitors the local weather, a local newspaper that obtains local information such as high school and college sports information, or any other suitable provider of information. Local information service 15 may be, for example, a local business with a computer for providing the scheduling information. If desired, local information service 15 may provide the scheduling information via Internet 24 to transmission server 84. There may be a number of local information services but only one has been shown to avoid overcomplicating the drawing.

A web server 86 is provided in each cable system headend 88. Cable system headend 88 has additional components (not shown) for distributing cable television signals to customers in the service area surrounding headend 88. Scheduling information (including video clips and associated television program data) is transmitted from transmission server 84 to each cable system headend 88 via satellite uplink 90 and satellite downlink 92. Each web server 86 uses the Internet TCP/IP protocol to make the scheduling information available to users at multimedia systems 94, 96, and 98 via respective communications links 100, 102, and 104. Communications links 100, 102, and 104 are Internet links formed from telephone links, radio-frequency (RF) links, cable modem links, satellite dish downlinks, combinations of links such as these, or any other suitable Internet connection paths. Although illustrated as direct links between multimedia systems 94, 96, and 98 and web server 86, communications links 100, 102, and 104 may be Internet paths that pass through extensive portions of the Internet.

Multimedia system 94 has personal computer 106 and may have television 108. Television 108 receives television signals from input 110. Alternatively, personal computer 106 may receive television programs from the Internet and provide them to television 108 for display. Access to web server 86 is provided via Internet communications link 100.

Multimedia system 96 has an integrated personal computer and television 112, such as the Gateway 2000 Destination PC-TV hybrid. Television signals may be received at input 114. Alternatively, television programming may be received from the Internet. Access to web server 86 is provided via Internet communications link 102.

Multimedia system 98 has an Internet capable set-top box 116, such as the TV OnLine® set-top box. Set-top box 116 may receive television signals via input 118. Access to web server 86 is provided via Internet communications link 104. Video display signals containing television and Internet information are provided to television 120 by line 122. In another suitable approach, television programming may be received from the Internet.

The system hardware shown in FIGS. 1-3 is illustrative and other suitable hardware arrangements may be used, if desired. Regardless of the particular hardware system that is used, however, the present invention preferably involves providing scheduling information and application features to users over the Internet in the form of multiple web pages that use the standard HyperText Transfer Protocol (HTTP). In the system of FIG. 1, web pages and associated scheduling application features (such as searching, etc.) are provided using web server 20. In the system of FIG. 3, web pages and associated on-line program guide features are provided using web server 86.

Because scheduling application services are provided using web pages, the services may be accessed using standard web browsers operating on the appropriate processing unit in the user's multimedia system. For example, in multimedia system 58 of FIG. 2, a web browser may be implemented using processing unit 60. Suitable web browsers include the Internet Explorer® web browser of Microsoft Corporation of Redmond, Wash. and the Netscape Navigator® web browser of Netscape Communications Corporation of Mountain View, Calif. Such web browsers support the viewing of various types of multimedia content, such as video stills (JPEG or GIF files) and video and audio clips (AVI, MOV, and MPG files). If desired, certain of these multimedia support functions may be provided as web browser plug-ins (i.e., special software modules designed to enhance the features of a web browser application). A suitable video player plug-in for MOV files is the Quicktime® application of Apple Computer, Inc. of Cupertino, Calif. AVI and MPG (or MPEG—Moving Picture Experts Group) files may be played using the Active-Movie® application of Microsoft Corporation. Scheduling application web pages may be created in any suitable language. Web pages may be in, for example, HyperText Markup Language (HTML), Dynamic HyperText Markup language (DHTML), or Extensible Markup Language (XML) code.

Figure 4:
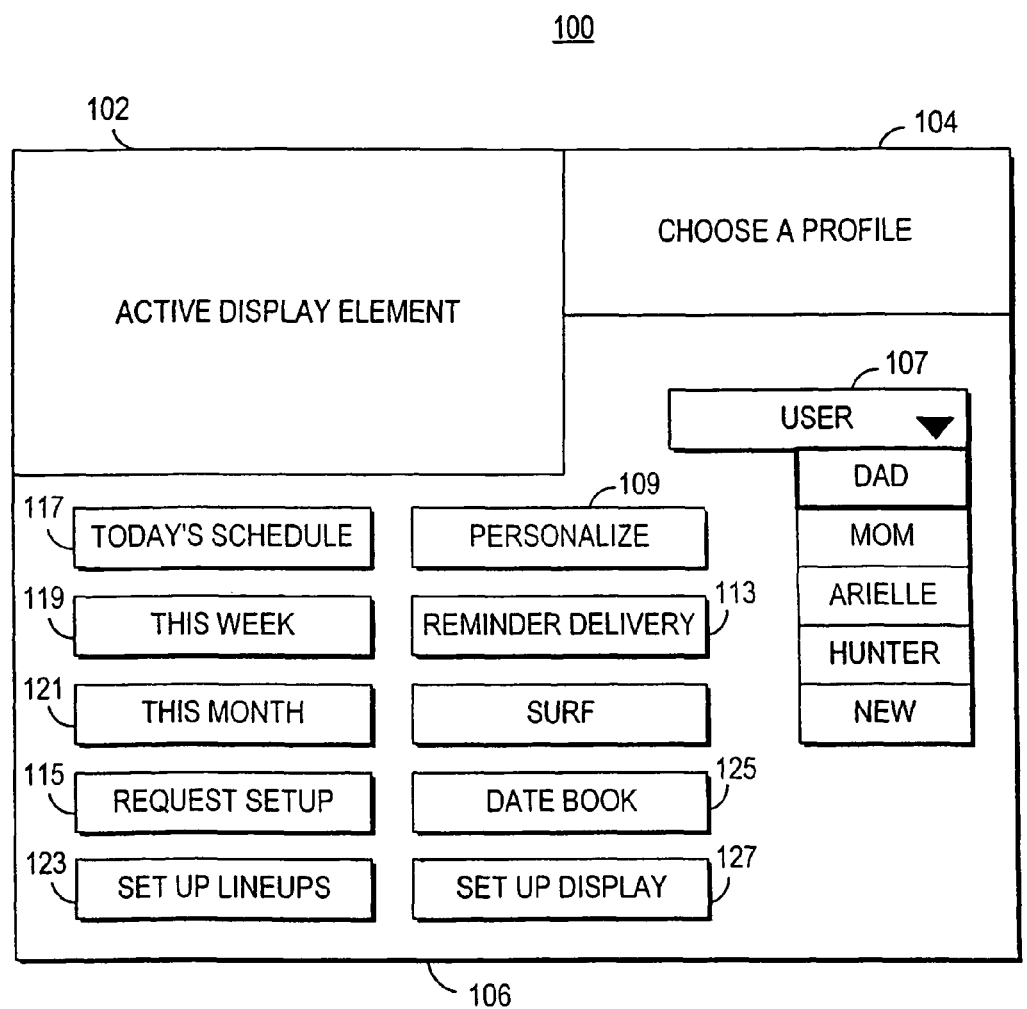
FIG. 4 shows an illustrative main menu page in accordance with the principles of the present invention.

An illustrative main menu page 100 for an on-line scheduling application in accordance with the principles of the present invention is shown in FIG. 4. Main menu page 100 may provide the user with an opportunity to access and personalize the display of scheduling information. Main menu page 100 has been shown as including active display element 102, information area 104, and options area 106, but in practice may include any suitable combination and arrangement of text, graphics, audio, or video. Active display element 102 may be any graphic, animation, interactive graphic or animation, video clip, video, or other suitable display element. Active display element 102 may display, for example, the currently tuned (or last tuned to) television program. Information area 104 may display context-sensitive help or other information for instructing the user or indicating what actions are available to the user.

Options area 106 may include any graphical user interface construct suitable for providing a user with an opportunity to access various features of the scheduling application. Options area 106 has been shown as including buttons that the user may select to, for example, see today's schedule, see this week's schedule, see this month's schedule, personalize the application, select reminder, mail, and notification delivery mechanisms, surf the web, set up scheduling application requests, set up multiple lineups, set up display characteristics, or access any other suitable feature.

Menu page 100 may also present the user with an opportunity to select a profile from a number of user profiles. Profile selector 107 has been shown as a drop down menu, but any suitable graphical user interface element may be used. In this example, four profiles have already been set. The user may select one of the profiles, or start a new one. The scheduling application uses profiles to search for schedule information and display the schedule information for the user in the manner personalized by the user.

Figure 5:
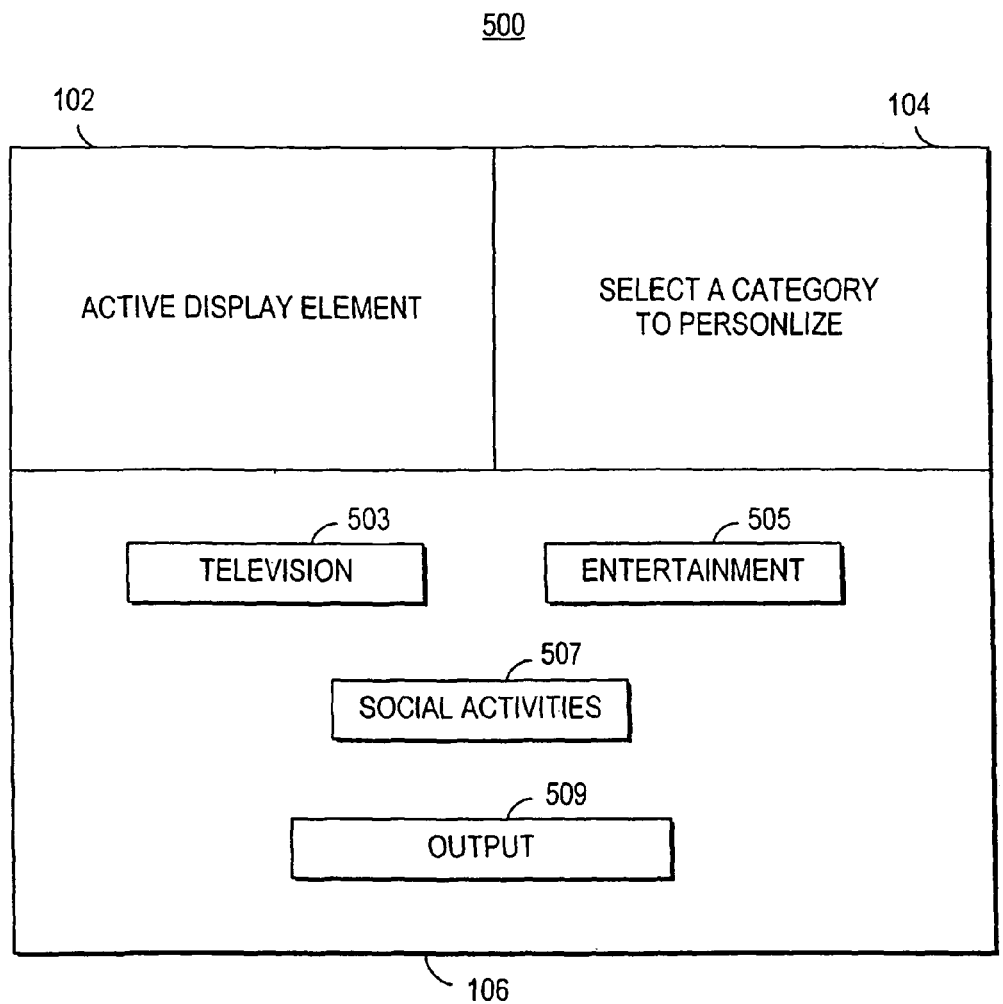
FIG. 5 shows an illustrative personalization page in accordance with the principles of the present invention.

Once the user has selected a profile or started a new profile (e.g., by selecting "New" and entering a name), the user may access any one of a number of scheduling application features. The user may personalize the application by, for example, selecting personalize button 109. The scheduling application may respond by providing a personalization page, such as personalization page 500 of FIG. 5. Personalization page 500 has been shown as including active display element 102, information area 104, and options area 106, but in practice may include any suitable combination and arrangement of text, graphics, audio, or video. As shown in FIG. 5, options area 106 of personalization page 500 may display a button for each available aspect of the scheduling system that the user may personalize. Users may, for example, personalize the television-related information, entertainment-related information, and social-activity-related information that is presented to the user by the scheduling application. Users may also personalize how scheduling information is delivered.

Figure 6A:
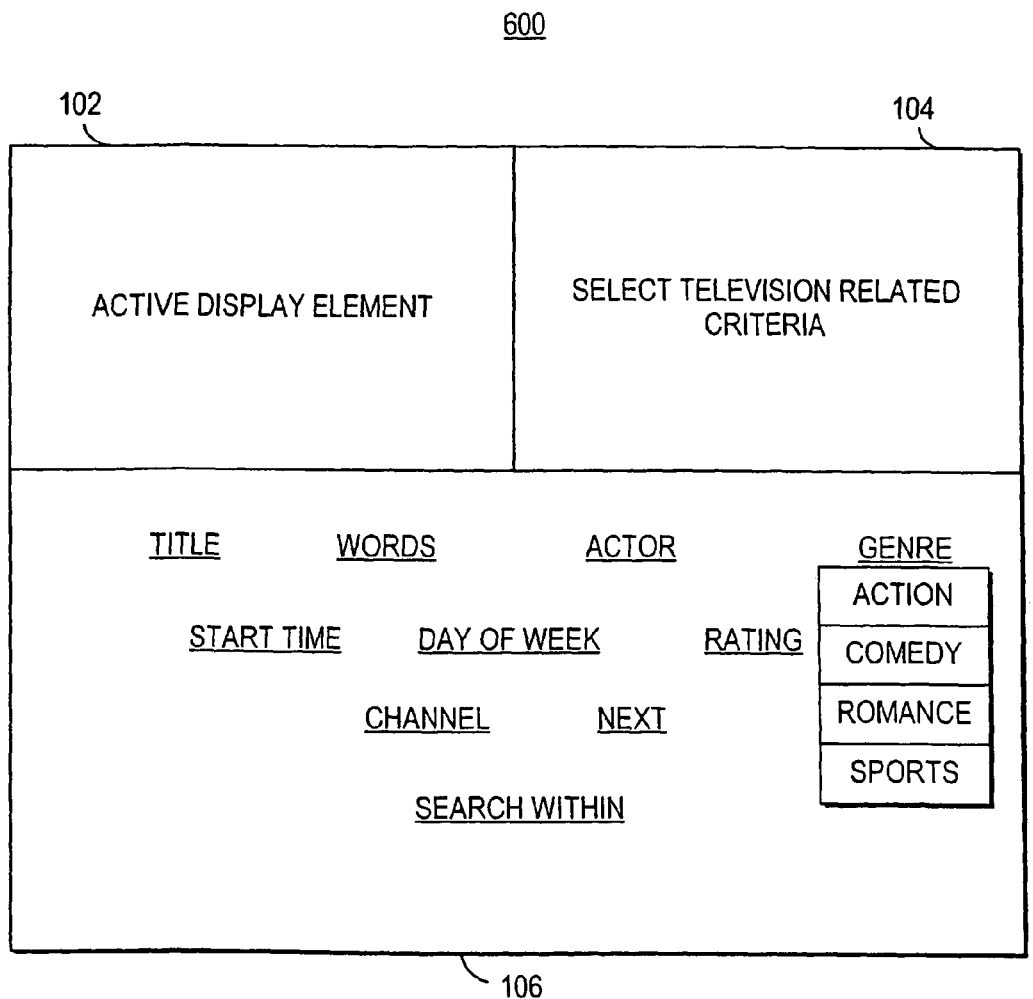
FIGS. 6a and 6b show illustrative television request pages in accordance with the principles of the present invention.

Users may indicate a desire to personalize television-related information by, for example, selecting television button 503. In response, the scheduling application may provide a television request page, such as illustrative television request page 600 of FIG. 6*a*. Users personalize their television-related information by defining one or more requests. Each request may include a number of criteria. Television request page 600, for example, allows a user to define television-related requests based on title, words, actor, genre, start time, day of week, rating, or channel. Any other suitable criteria may be used. If desired, the television-related criteria may be statically programmed into the request page code, or may be dynamically derived from data provided to web server 26 or 88 by transmission server 16 or 84.

Users may define television requests by successively selecting criteria and then assigning them one or more values. For example, the user may decide to personalize his or her television-related information by limiting the information to comedies. The user may select "GENRE", and then pick a genre or genres from an on-screen list. Alternatively, the on-screen list may be displayed automatically when, for example, the user passes an on-screen pointer over the option "GENRE". The user may then select one or more genres from the list. Any other suitable approach for providing a user with an opportunity to select the criteria and select values for the criteria may be used.

In still another suitable approach, the user may be prompted before selecting criteria or values. Prompts may, for example, be displayed in options area 106. After selecting "Comedy" for example, options area 106 may read "Your Criteria currently includes the following: Genre Comedy. Would you like to add to the criteria?" The user may add more criteria or set additional values criteria already selected by, for example, selecting an on-screen "Yes" button. In response, the scheduling application may provide television request page 600, and the user may select more criteria and assign them corresponding values. The user may, for example, select "Channel" and assign a channel value (e.g., Channel 23 criteria Fox KOKI). In response, options area 106 may read "Your criteria currently includes the following: Genre Comedy, Airing on Channel 23 Fox KOKI. Would you like to add to the criteria?" The user may then, for example, select an on-screen "Yes" button to add more criteria or set additional values for criteria already selected.

Figure 6B:
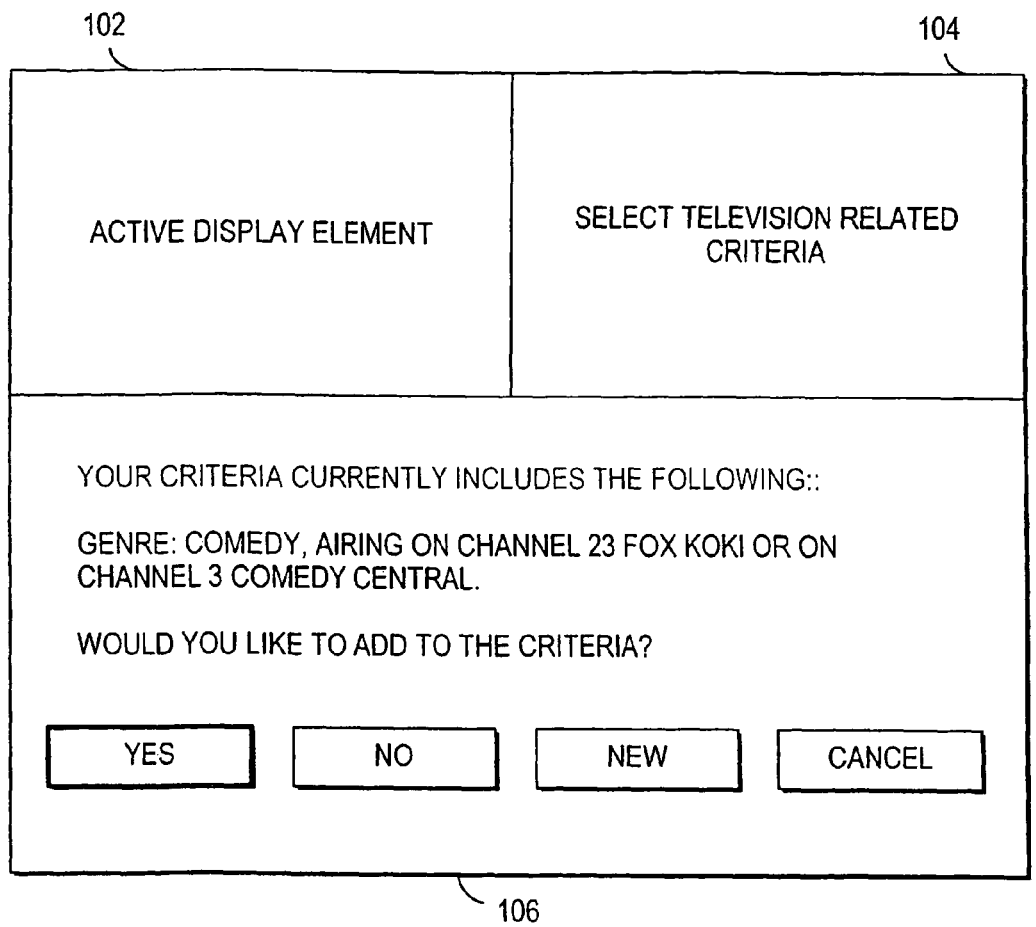

The scheduling application may provide television request page 600, and the user may select more criteria and assign them corresponding values. For the purposes of illustration, the user may select "Channel" and assign a value of Channel 3 Comedy Central, as shown in FIG. 6b. This process of selecting criteria and assigning corresponding values may proceed until the user indicates the user has completed the television-related request by, for example selecting "No". Alternatively, the user may select "Next" to save the request and create another. The user may cancel the request by, for example, selecting "Cancel".

Figure 7:
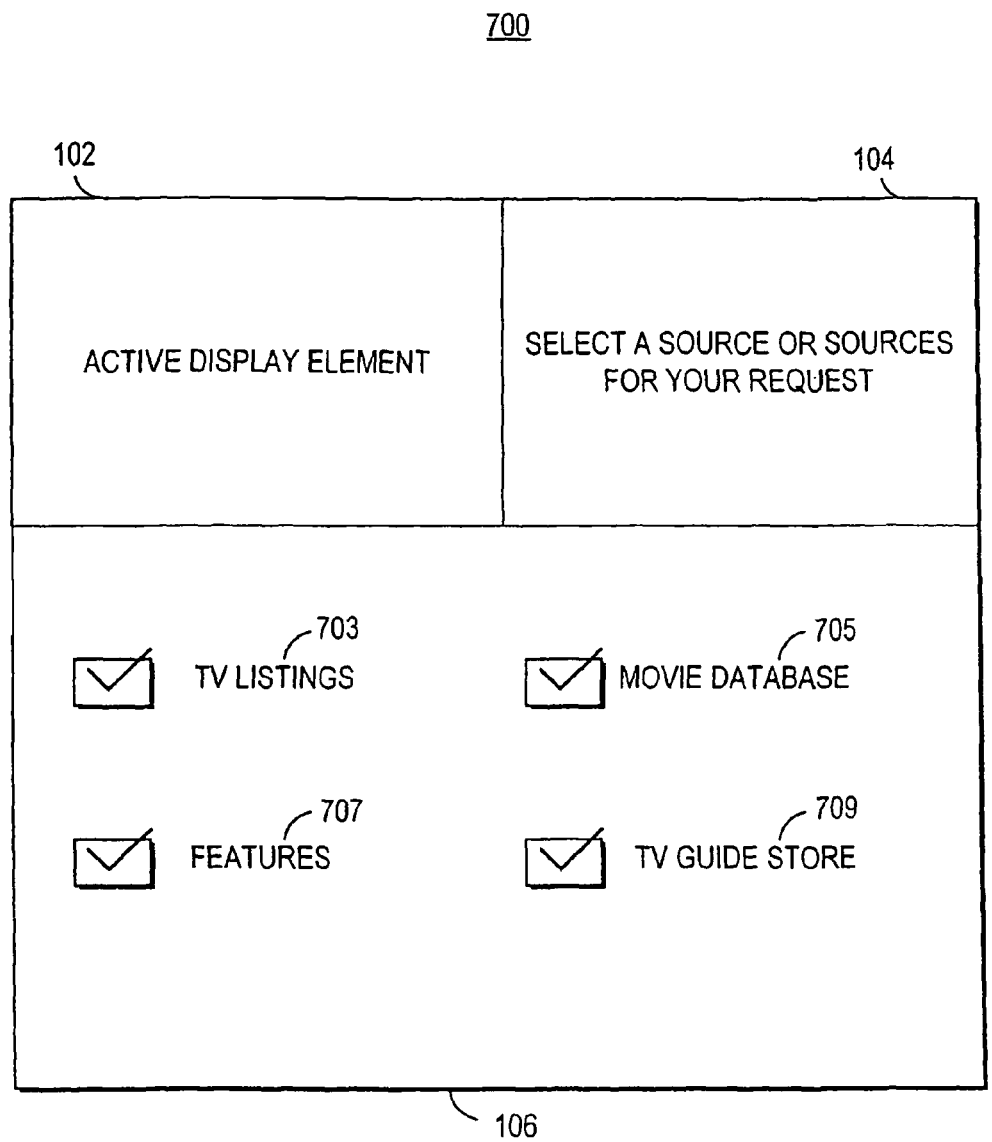
FIG. 7 shows an illustrative search within page in accordance with the principles of the present invention.

The user may also personalize his or her television-related information viewing experience by selecting the sources from which the scheduling application may obtain television-related information. In response to the user selecting "Search Within" from options area 106 of television request page 600 (FIG. 6a), for example, scheduling application may provide a search within page. An illustrative search within page is shown in FIG. 7. Search within page 700 has been shown as including check-boxes, but any suitable graphical user interface may be used for providing the user with an opportunity to select the databases from which the scheduling application may obtain television-related information (e.g., the user may enter a name).

The sources shown in search within page 925 may be coded into the page code. Alternatively, the sources may be dynamically obtained by the scheduling application and inserted into the page. The sources may be dynamically obtained, for example continuously, each time the user accesses the page, or with any other suitable frequency, from data provided to web server 26 or 88 by transmission server 16 or 84. Options area 106 may list the sources available to the user for personalizing his or her television-related information viewing experience. The sources listed in FIG. 7 are only illustrative. In practice, there may be more or less sources with similar or different focuses than those sources shown.

In this example, the scheduling application may provide television-related information from four sources. TV Listings database 703 may include, for example, national and local television program listings. Movie database 705, for example, may include movie listings for new releases available on premium channels, through pay-per-view services, through near video-on-demand (NVOD) services, or through video on demand (VOD) services. Features database 707 may include, for example, information relating to editorial features. TV Guide store database 709, for example, may include merchandise descriptions and ordering information.

The databases may be independently maintained by system 10 (FIG. 1) or system 78 (FIG. 3). The databases may be relational and may be cross-indexed so that records of each database are associated with the other. In this manner editorials and merchandise, for example, may be associated with particular programs on new releases. If desired, one or more of the sources may be web sites.

Figure 8:
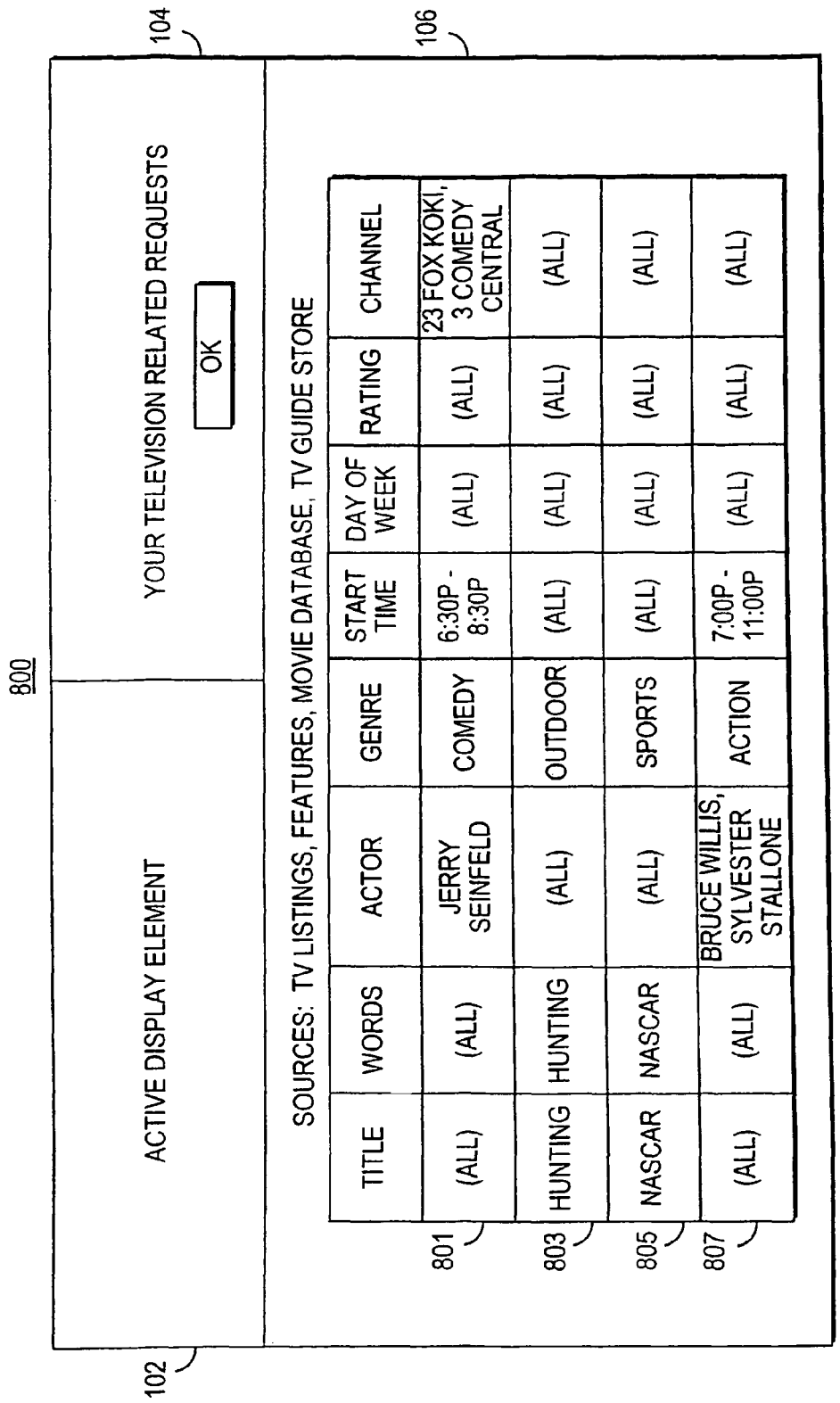
FIG. 8 shows an illustrative television requests summary page in accordance with the principles of the present invention.

After the user is finished entering requests and has selected which sources the user wants searched, the scheduling application may summarize the user's personalized viewing experience in one or more request summary pages. An illustrative television requests summary page 800 is shown in FIG. 8. In this example, the user has four pending requests that define the user's personalized television-related information viewing experience. The user has defined request 801, for example, to include all television-related information related to programs of Genre Comedy, that start between 6:30 and 8:30 P.M. on channel 23 Fox KOKI or 3 Comedy Central, and that have actor Jerry Seinfeld. The user has defined request 803 for example, to include all television-related information related to programs of Genre Outdoor and that have the word "Hunting" in their titles or descriptions. The user has defined request 805, for example, to include all television-related information related to programs of Genre "Sports" and that have the word "NASCAR" in their titles or descriptions. The user has defined request 807, for example, to include television-related information for programs of Genre "Action", starting between 7:00 and 11:00 P.M., and having actors Bruce Willis or Sylvester Stallone. Television Requests Summary Page 800 may also indicate to the user the databases or web sites that the user has selected as sources. The user may indicate a desire to exit requests summary page 800 by, for example, selecting "OK". The user may return to a request page and edit a given request by, for example, selecting the request (e.g., double-clicking on the request).

Figure 9:
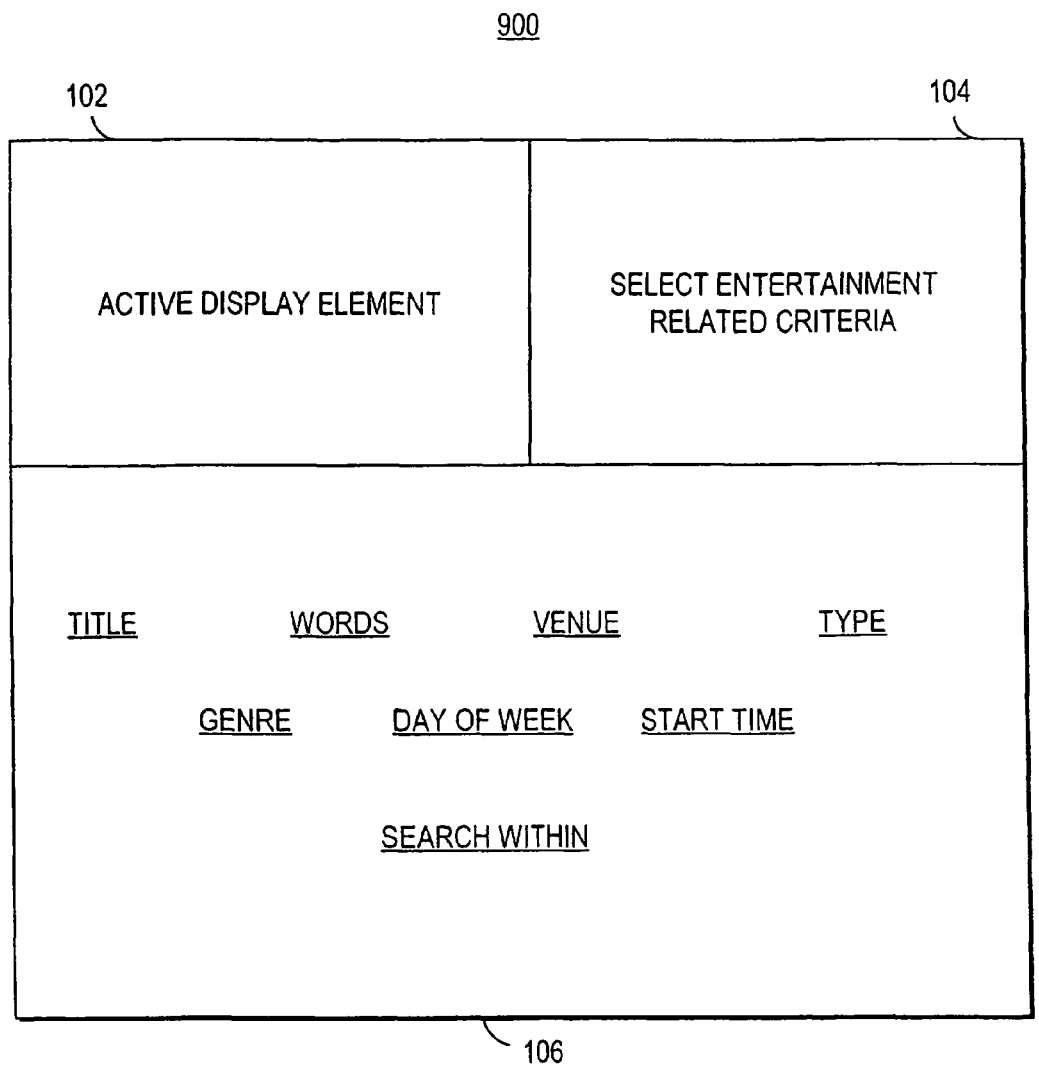
FIG. 9 shows an illustrative entertainment request page in accordance with the principles of the present invention.

The scheduling application may also provide users with an opportunity to personalize their entertainment-related information viewing experience. Users may indicate a desire to personalize entertainment-related information by, for example, selecting entertainment button 505 of personalization page 500 (FIG. 5). In response, the scheduling application may provide an entertainment request page, such as entertainment request page 900 of FIG. 9. Users may define entertainment-related requests by, for example, selecting criteria and assigning values to the criteria. Entertainment request page 900, for example, allows users to define entertainment-related requests based on title, description, venue, type of event (e.g., movie, theater, concert, sporting event), genre, day of week, or start time. This list is illustrative, and any suitable entertainment-related criteria may be used. If desired, the entertainment-related criteria may be statically programmed into the request page code, or may be dynamically obtained by the scheduling application from data provided to web server 26 or 88 by transmission server 16 or 84.

Users may define entertainment-related requests by successively selecting criteria and then assigning them one or more values. Alternatively, the user may be prompted to select criteria and to select each value. In practice, any approach that is suitable for the chosen user interface may be used.

Figure 10:
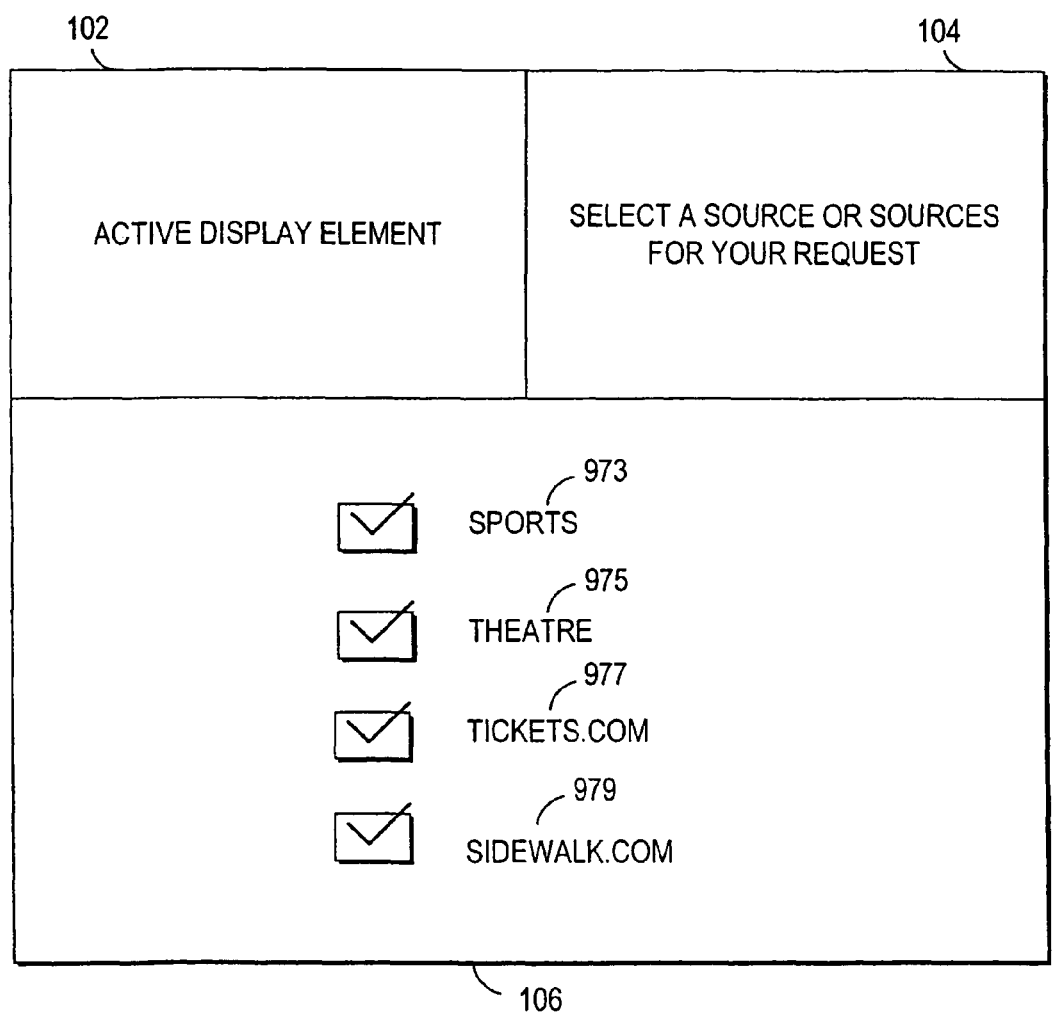
FIG. 10 shows an illustrative search within page in accordance with the principles of the present invention.

The user may also personalize his or her entertainment-related information viewing experience by selecting the sources from which the scheduling application may obtain entertainment-related information. In response to the user selecting "Search Within" from options area 106, the scheduling application may display a search within screen. Illustrative search within page 925 is shown in FIG. 10. In this example, the scheduling application provides users with an opportunity to select up to four available sources. The sources shown in search within screen 925 may be coded into the search within page code, or may be provided as data and inserted into the page. Sources 973 and 975, for example, are databases of sporting events and theater schedules, respectively. These databases may be maintained by the scheduling application system, or may be maintained by a local information service and provided to systems 10 or 78. Sources 977 and 979 are Internet web sites that contain entertainment-related information.

The user's personalized entertainment-related viewing experience may be summarized in one or more summary pages, such as entertainment requests summary page 950 of FIG. 11. In the example of FIG. 9b, the user has four pending requests that define the user's personalized entertainment-related information viewing experience. The user has defined request 901, for example, to include all entertainment-related information related to musical theatrical productions with the word "Christmas" in their description and shown at Radio City Music Hall or Madison Square Garden on a Saturday. The user has defined request 903, for example, to include entertainment-related information related to concerts having "Mozart" in their description played at Avery Fisher Hall on Thursdays at 7:00 pm. The user has defined request 905, for example, to include entertainment-related information related to Elton John concerts at Radio City or Madison Square Garden on Fridays. The user has defined request 907, for example to include all Yankee Games in New York played on a Friday or Saturday. Entertainment requests summary page 950 may also indicate the sources that the user has selected. The user may return to a request page and edit a request by, for example, selecting the request (e.g., double-clicking on the request).

Figure 12:
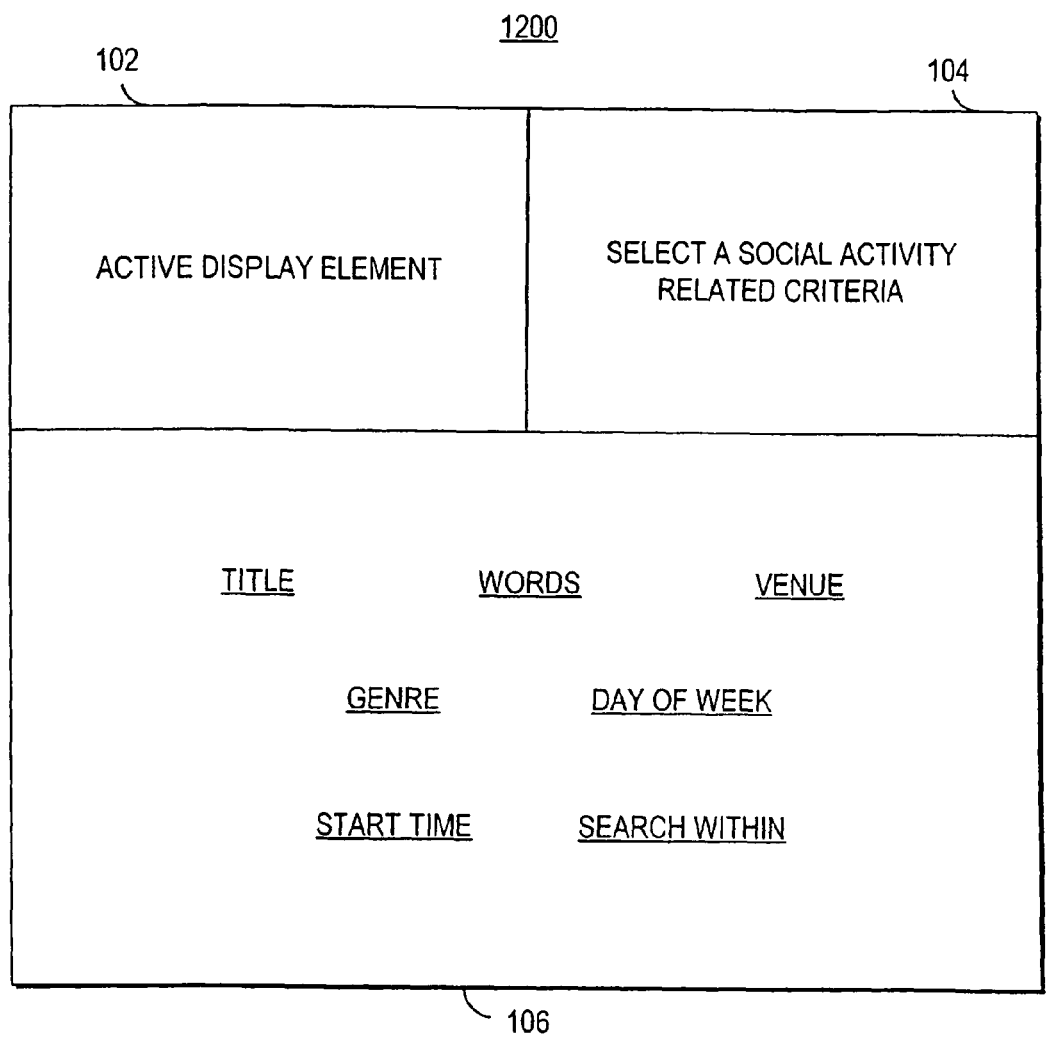
FIG. 12 shows an illustrative social activity request page in accordance with the principles of the present invention.

The scheduling application may also provide users with an opportunity to personalize their social-activity-related viewing experience. Users may indicate a desire to personalize social-activity-related information by, for example, selecting social activities button 507 (FIG. 5). In response, the scheduling application may provide a social activity request page, such as social activity request page 1200 of FIG. 12.

Users may define entertainment-related requests by, for example, selecting criteria and assigning values to the criteria. Social activity request page 1200, for example, allows users to define entertainment-related requests based on title, words, venue, genre, day of week, start time, or any other suitable criteria. If desired, the social-activity-related criteria may be statically programmed into the request page code, or may be dynamically derived from data provided to web server 26 or 88 by transmission server 16 or 84. Users may define social-activity-related requests by successively selecting criteria and assigning them one or more values. Alternatively, the user may be prompted to select each criteria and to set each value. The practice, any approach that is suitable for the chosen user interface may be used.

Figure 13:
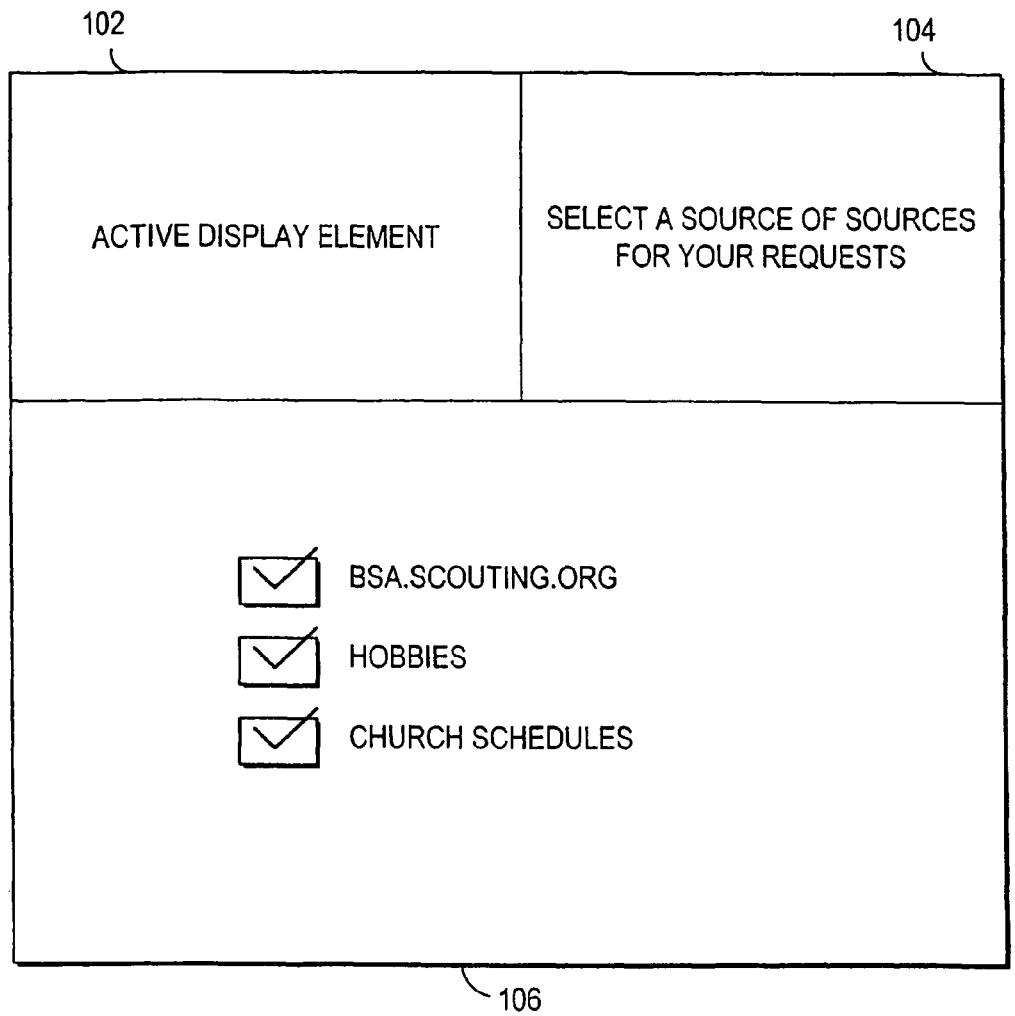
FIG. 13 shows an illustrative search within screen in accordance with the principles of the present invention.

The user may also personalize his or her social-activity-related information viewing experience by selecting the sources from which the scheduling application may obtain social-activity-related information. In response to the user selecting "Search Within" from options area 106, the scheduling application may display a search within screen. Illustrative-search within screen 1300 is shown in FIG. 13. In this example the user is provided with an opportunity to choose from three sources. Source 1305, for example, is the Boy Scouts web site. Sources 1310 and 1315, for example, are databases maintained by the scheduling application system in which schedules for hobby related clubs and groups and schedules for church programs are stored, respectively.

Figure 14:
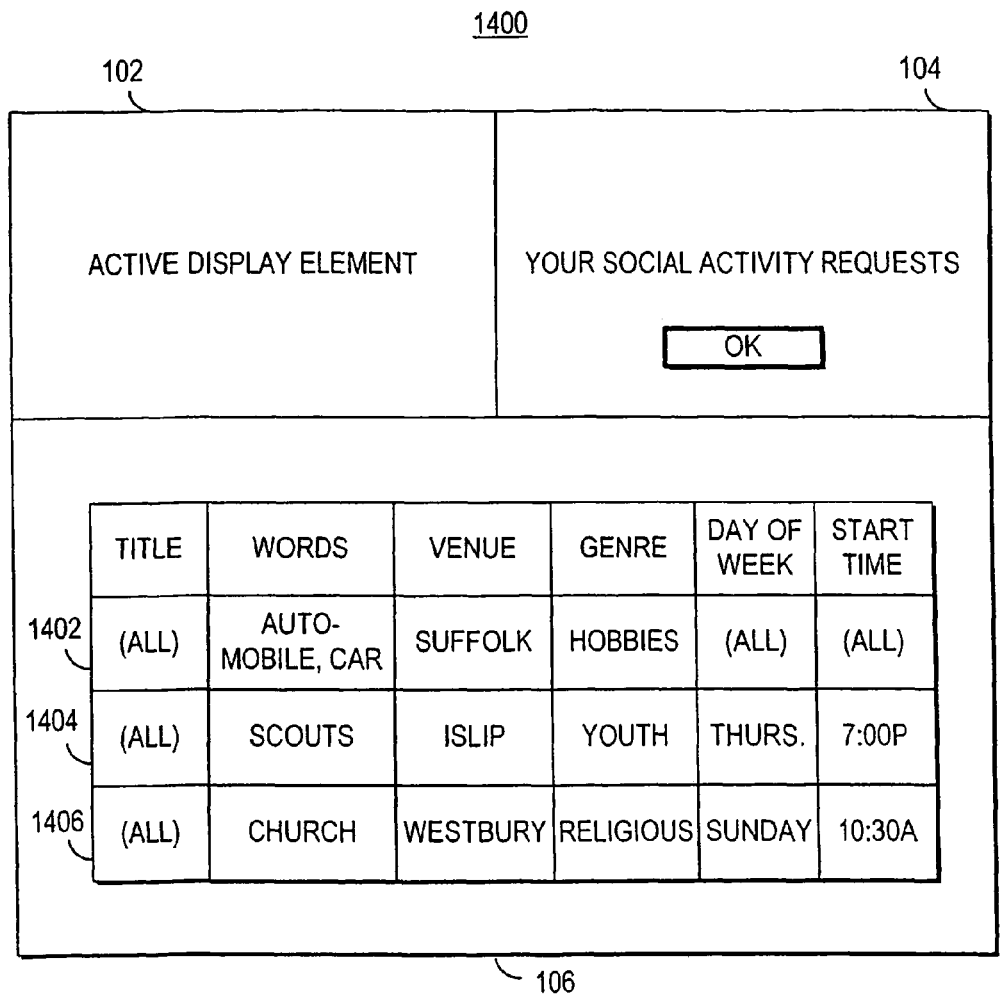
FIG. 14 shows an illustrative social activity requests summary page in accordance with the principles of the present invention.

The user's personalized social-activity-related viewing experience may be summarized in a summary page, such as social activity requests summary page 1400 of FIG. 14. In the example of FIG. 14, the user has three pending requests that define the user's personalized social-activity-related information viewing experience. The user has defined request 1402, for example, to include all social-activity-related information of the genre "Hobbies" having the words "Automobile" or "Car" in their descriptions, and that are in Suffolk county. The user has defined request 1404, for example, to include all social-activity-related information of the genre "Youth" with "Scouts" in their descriptions, and for events starting at 7:00 P.M. on Thursdays in the town of Islip. The user has defined request 1406, for example, to include all social-activity-related information of the genre "Religious" with "Church" in their descriptions, and for events starting at 10:30 A.M. on Sundays in the town of Westbury. Social activity requests summary page 1400 may also indicate to the user the sources that the user has selected. The user may return to a request page and edit a request by, for example, selecting the request (e.g., double-clicking on the request).

The scheduling application may maintain a list or lists of the available sources that are inserted into search within pages, such as search within pages 700, 925, and 1300. The application may, for example, search the web for suitable sources using standard web-searching techniques. Alternatively, web sites may post information describing themselves to the scheduling application (e.g., via e-mail). The scheduling application may determine whether the web site is television, entertainment, or social-activity-related, based on the information provided. Alternatively, the scheduling application may search the web site and characterize the site itself. The scheduling application may, for example, include the site in a list of sources for each search within screen, or may maintain a single file of sources in which each source is identified with one or more search within screens. Found sites may be queried by the scheduling application periodically (e.g., daily, hourly, or with any other suitable frequency), or each time a user requests information. Alternatively, other web sites may provide information to the scheduling application automatically (e.g., when posting new information) or periodically.

Users may also personalize their scheduling information viewing experience by selecting the delivery scheme or schemes by which scheduling information is automatically delivered to the user. Users may indicate a desire to select one or more delivery schemes by, for example, selecting Reminder Delivery option 113 from menu page 100 (FIG. 4). If desired, users may select delivery schemes at the application level (i.e., select them once for delivery of all information), at the schedule information type level (i.e., select one set of schemes for television-related information, one set of schemes for entertainment-related information, and one set of schemes for social-activity-related information), at the request level (i.e., for each request), or any suitable combination thereof. In response to a user indicating a desire to select one or more delivery schemes, the scheduling application may provide one or more delivery pages, such as illustrative delivery page 1500 of FIG. 15.

In delivery page 1500, users may select delivery schemes by selecting check-boxes associated with the delivery schemes. In practice, however, any suitable graphical user interface may be used (e.g., the user may be require to enter a name or chooses a number corresponding to a given delivery scheme). In this example, users may choose from five delivery schemes: continuous delivery, e-mail delivery, HTML mail delivery, pager/digital phone reminder, and pager/digital phone notification. Users may select e-mail delivery to receive text-only versions of personalized scheduling information. This information may include hyperlinks to the related content if desired. Users may select HTML mail delivery to receive an HTML version of personalized scheduling information.

In practice, the number and type of delivery schemes provided may depend on how the scheduling application system is implemented. Continuous delivery, for example, may require a transmitter in the scheduling application system 10 or on-line television program guide system 78, and a receiver in multimedia system 58 configured to continuously transmit and receive scheduling information, respectively. Users may select pager/digital phone program reminder delivery to receive short text reminders of scheduling information found according to the user defined requests. The reminders may be provided at a predetermined time before an event associated with the scheduling information (e.g., twenty or thirty minutes). Users may select pager/digital phone update notification delivery to receive short text notifications indicating new scheduling information has been found that matches the user's requests. These approaches may require an e-mail addressable pager or digital phone or, alternatively, software and transmission hardware in the scheduling application system suitable for providing data directly to the pager or digital phone. This list is only illustrative, as any suitable combination of mail, reminder, or notification delivery schemes may be used.

Figure 16:
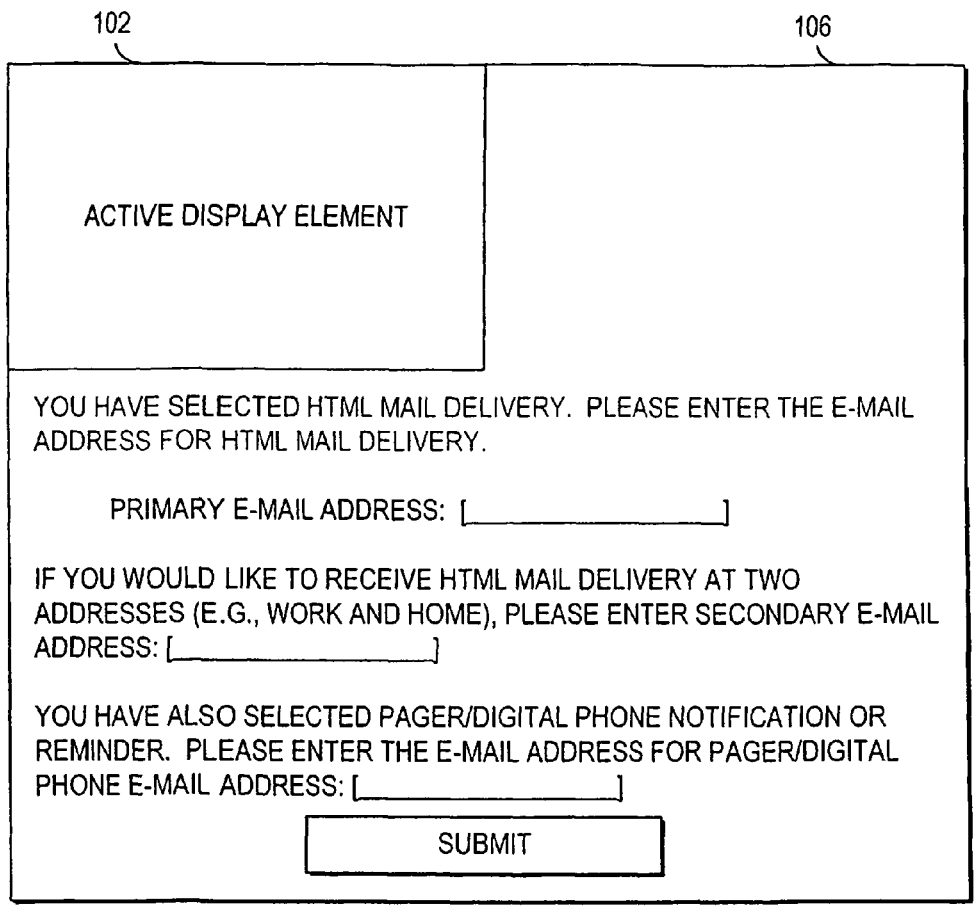
FIG. 16 shows an illustrative query page in accordance with the principles of the present invention.

In this example, the user has selected HTML mail delivery and pager/digital phone reminder delivery. This combination provides the user with the ability to review scheduling information each time the user accesses his or her e-mail, and to receive reminders of events. The user may indicate that he or she is finished selecting delivery schemes by, for example, selecting "Finish". In response to the user indicating that he or she is finished, the scheduling application may query the user for e-mail addresses or other information necessary for delivering e-mail, reminders, or notifications. FIG. 16 shows an illustrative query page in which the user is prompted for relevant e-mail addresses.

Figure 17A:
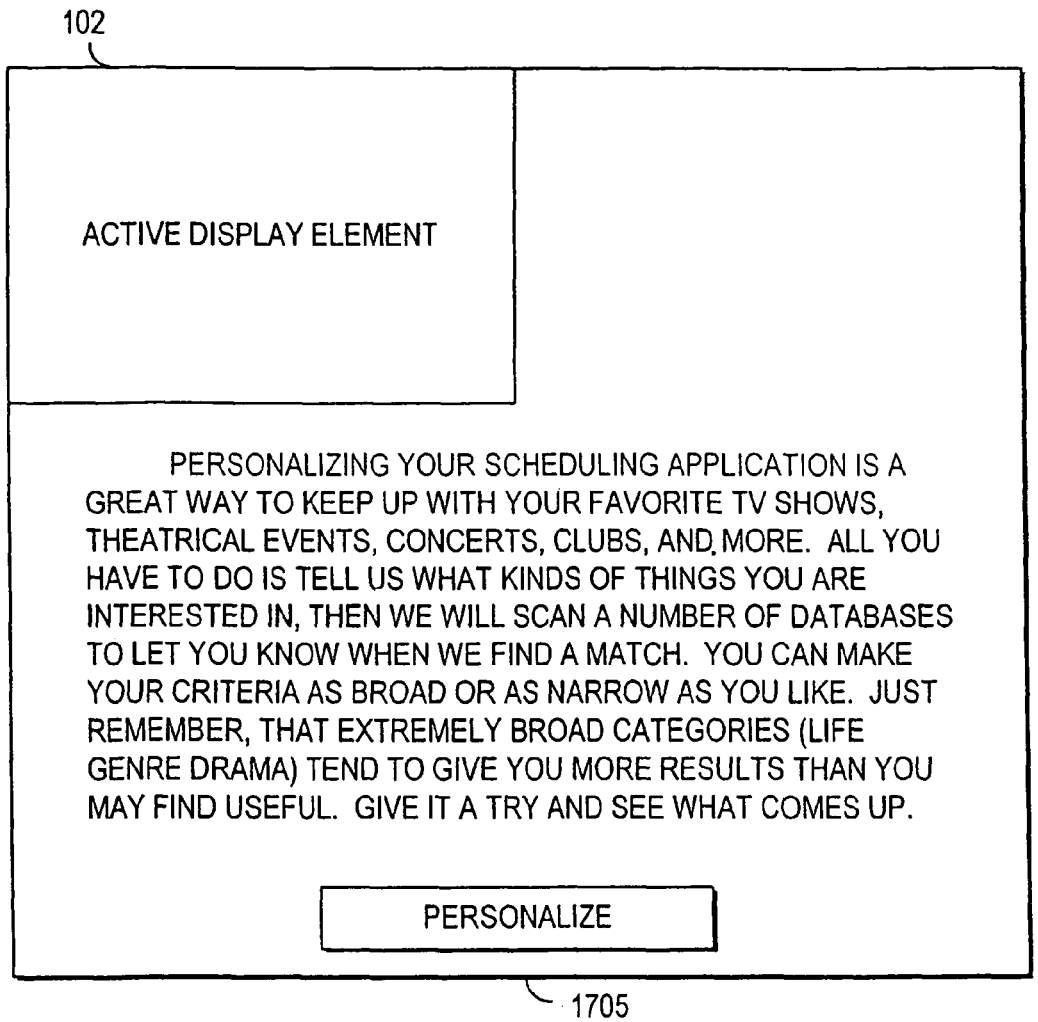

The scheduling application may also provide users with an opportunity to centrally manage requests. Users may indicate a desire to centrally manage requests by, for example, selecting Request Setup option 115 from main menu page 100 (FIG. 4). In response, the scheduling application may provide a request setup page, such as request setup page 1700 of FIGS. 17*a*, 17*b* and 17*c*. The scheduling application may provide request setup page 1700 of FIG. 17*a* when the user has not personalized the scheduling application. Request setup page 1700 may instruct the user on the benefits of personalization and may provide the user with an opportunity to personalize the scheduling application. In response to the user selecting "Personalize" option 1705, for example, the scheduling application may provide a personalization page (e.g. personalization page 500 of FIG. 5).

The scheduling application may provide request setup page 1700 of FIGS. 17*b* and 17*c* when the user has personalized the scheduling application. Request setup page 1700 may include a display of each of the requests defined by the user. If the requests are too numerous to fit in one page, the user may scroll down to view additional requests (as shown in FIG. 17*c*), or up to see previously viewed requests (as shown in FIG. 17*b*). Users may modify requests by, for example, highlighting a request and selecting "Modify". In response, the scheduling application may provide the user with a request page corresponding to the request. Users may delete requests by, for example, highlighting a request and selecting "Delete".

Figure 18:
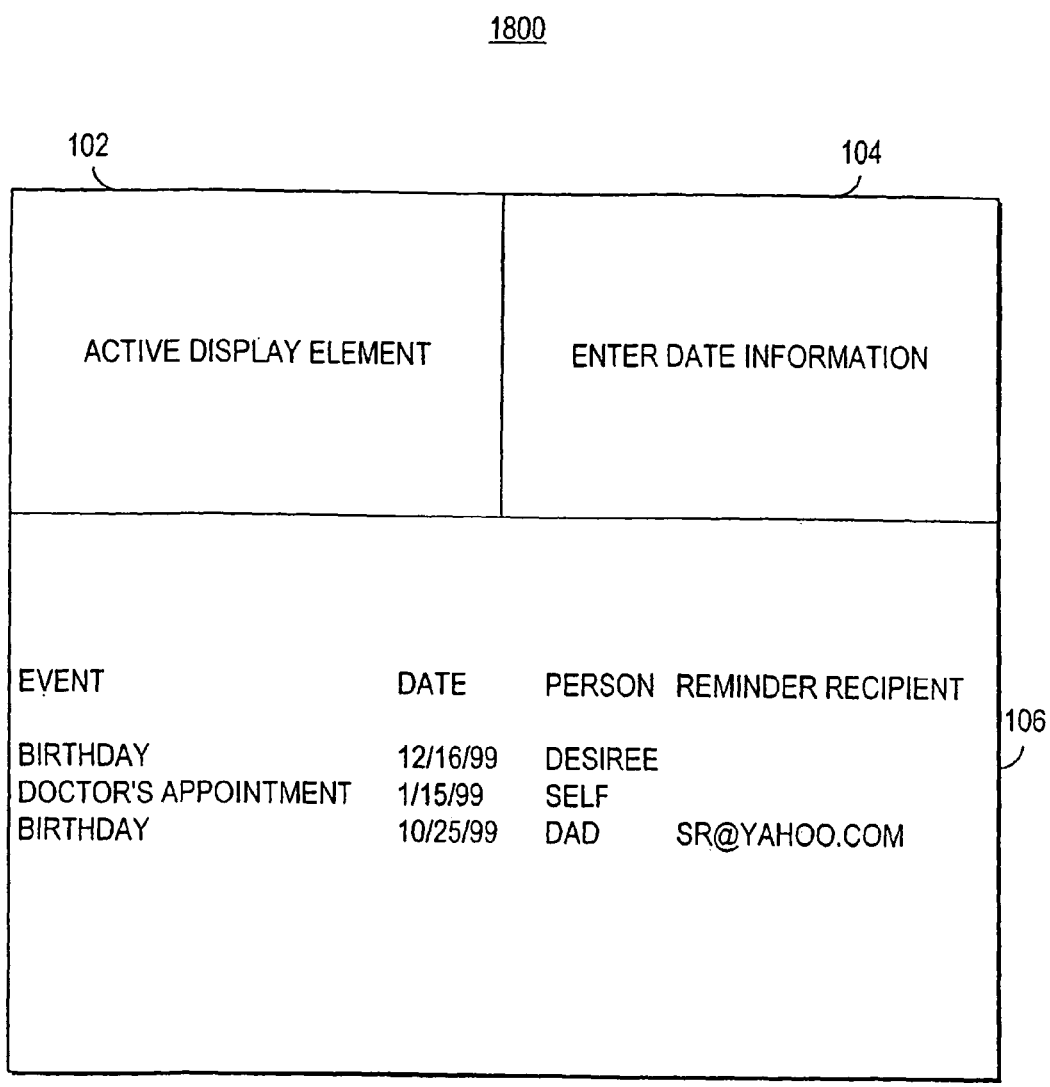
FIG. 18 shows an illustrative date book page in accordance with the principles of the present invention.

The scheduling application may also provide users with an opportunity to enter scheduling information for events that are personal to the user, such as birthdays, anniversaries, holidays, or other important events. In response to, for example, the user selecting Date book option 125 from main menu page 100 (FIG. 4), the scheduling application may provide illustrative date book page 1800 of FIG. 18. Date book page 1800 may provide users with an opportunity to schedule one or more events by entering, for example, event types, dates, persons, reminder recipients, or any other suitable information. When the user enters an e-mail address into the reminder recipient field, the scheduling application will send that person an e-mail. The content of the e-mail may be provided by the scheduling application based on the type of event. Alternatively, the user may be provided with an opportunity to enter text that will be inserted into the e-mail. The scheduling application may use the date book as an additional source from which the scheduling application obtains scheduling information. The user defined events may be displayed in an appropriate results page (described below). The user defined events may also be included in a reminder provided to the user at a pre-defined or user-defined time before the event.

The scheduling application may also write events to the user's date book to provide the user with reminders for events that the user did not enter into the date book. The scheduling application may maintain user histories that track the types of personalization criteria users select, the types of information that the user searches for, the types of products ordered, the events set in the date book, or any other suitable condition or event. The scheduling application may, for example, insert special dates into the date book once the dates have expired (e.g., it may automatically re-enter birthdays once they have passed). In another suitable approach, the scheduling application may automatically re-enter events the user enters on a recurring basis.

The on-line scheduling application may remind users of other types of events. If a user indicates that the user is interested in cars for example, the user may receive a reminder each fall reminding the user to flush his or her car's radiator and replace the engine coolant. Alternatively, the scheduling application may track a user's on-line purchases to remind the user when to purchase additional items.

Figure 19:
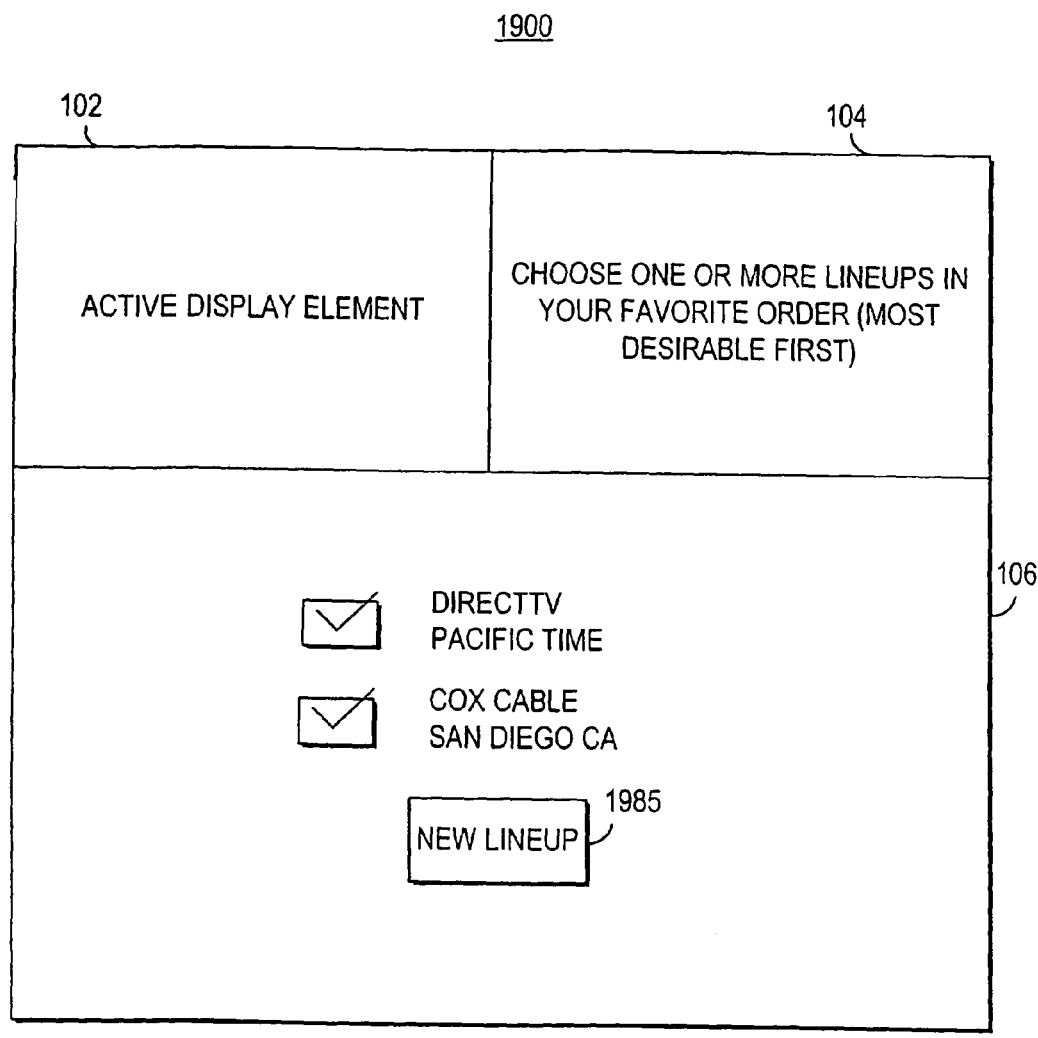
FIG. 19 shows an illustrative lineups page in accordance with the principles of the present invention.

In some households, users may have more than one television delivery platform. Some digital satellite services (DSS) homes, for example, also maintain a basic cable connection for clear reception of local channels. Some households may have television programs delivered over the Internet. In systems providing television-related information, such as on-line television program guides, the scheduling application may provide users with an opportunity to set up lineups for which television-related information is displayed. FIG. 19 shows an illustrative lineups page 1900. The scheduling application may provide lineups page 1900 in response to, for example, a user selecting set up Lineups Option 123 from menu page 100. Lineups page 1900 may provide the user with an opportunity to select one or more lineups that the user is interested in. Lineups page 1900 is shown as having check-boxes, but any suitable graphical user interface may be used (e.g., the user may be require to enter the name or names of the desired lineups).

The scheduling application may present available lineups using any suitable approach. Users may for example, enter lineups by name. In this approach, options area 106 of lineups page 1900 may be initially blank until a user enters a lineup by, for example, selecting "New Lineup" option 1985. In another suitable approach, the scheduling application may maintain a database of available lineups by zip code, and display a list of available lineups to the user based on the user's zip code. In still another suitable approach, the scheduling application may poll or query the user's media system for the type of hardware installed, using a suitable protocol (e.g., the Simple Network Management Protocol (SNMP)). The scheduling application may determine one or more available lineups from the result of the poll or query. If desired, a combination of these approaches, or any other suitable approach for determining available lineups, may be used.

Once a user has personalized his or her scheduling information viewing experience by, for example, defining requests, selecting sources, choosing a primary and secondary lineup (if applicable), or any suitable combination thereof, the scheduling application may obtain scheduling information for the selected lineups (if appropriate for a given source) from the selected sources and provide the information in one or more results pages. In practice, the scheduling application may obtain scheduling information from the selected sources using any approach suitable for the hardware on which the system is implemented and the number of users the hardware can adequately handle. The scheduling application may, for example, continuously monitor the sources. As new information is stored in or posted to the sources, the scheduling application may determine if the new information meets any of the defined requests. If desired, each user may have a process running on scheduling system 19, web server 20, program guide scheduling system 87, or web server 86. Each request may be a separate thread within a single process for a given user. In one suitable approach, the processes may run distributively across scheduling system 19 and web server 20, or across program guide scheduling system 87 and web server 86, using a distributed object oriented approach such as the distributed component object model (DCOM). In such an approach, data servers 14 and 82 may maintain object oriented databases.

In another suitable approach, the scheduling application may reside on web servers 20 or 86 acting as a front-end to users. The scheduling application may periodically query systems 19 or 87 for scheduling information. In approaches where systems 19 and 87 store data and media using a relational database (such as a Structured Query Language (SQL) database), the scheduling application may transform the user requests into SQL requests and transmit the SQL requests to systems 19 or 87 each time the user accesses the scheduling application. In still another suitable approach, systems 19 or 87 may indicate to web servers 20 or 86 when new scheduling information is available.

When sources are not cross-referenced, links between related scheduling information may not be established. After searching each source for scheduling information meeting the user defined requests, the scheduling application may re-search the sources for scheduling information related to the scheduling information found on the first pass, using one or more keywords from the already found results. For example, if a television program listing for "Seinfeld" meets a user defined request, the scheduling application may then re-search other selected sources for information with "Seinfeld" in their titles. This approach may also be used when the scheduling application searches a source that does not have fields that map to the criteria used to defined requests (e.g., a given source may not provide a "start times" field).

The scheduling application may provide personalized scheduling information in one or more results pages. The scheduling information may be sorted, for example, alphabetically, by topic, by start time, by request, or using any other suitable approach. The scheduling application may provide users with an opportunity to view personalized scheduling information for the current day, week, month, or any other suitable period. Users may indicate a desire to view personalized scheduling information for the current day, week, or month by, for example, selecting options 117, 119, or 121 (FIG. 4) from main menu page 100, respectively.

Results pages may include any suitable combination of text, graphics, video, or audio. Illustrative results pages for the current day, week, and month are shown in FIGS. 20a, 20b and 20c, respectively. The results pages of FIGS. 20a, 20b, and 20c organize the scheduling information by type and include links 1905 that allow users to jump to regions of the page having scheduling information of the desired type. Users may scroll the page up and down to see additional results. Providing users with opportunities to jump and scroll may allow users to more conveniently access regions of television-related information and non-television-related information (e.g., entertainment-related and social-activity-related information) that are contained in the same web page. FIG. 20a, for example, illustrates how a results page for the current day may look when a user is at the top of the page. FIG. 20b, for example, illustrates how a results page for the current week may look when a user has scrolled down to approximately the middle of the page. FIG. 20c, for example, illustrates how a results page for the current month may look when a user has scrolled down to the bottom of a page. Users may also change the current channel lineup by, for example, selecting Switch Lineup option 1907.

Request results 1920 within each type of scheduling information are shown organized by source. Users may review request results 1920 and change a request by, for example, selecting a request number for a given result. Request results 1920 may include any suitable combination of text, graphics, or video. Results 1920 may include, for example, graphics 1917. Graphics 1917 may be, for example, a logo for a given television program, a graphic of an orderable item, or any other suitable graphic. Users may obtain additional information about a result 1920 by, for example, selecting a result.

FIGS. 20a and 20b also illustrate how the scheduling application may provide results by re-searching the scheduling information. In FIG. 20a, for example, merchandise is found based on the title "Seinfeld" from the television program listing result 1920 of request 1. In FIG. 20b, for example, merchandise is found based on the title "Yankees" from the entertainment result 1920 of request 8. In this example, these results were retrieved from TV Guide Store source 709 of FIG. 7 based on results found in other sources (e.g., TV Listings source 703 of FIG. 7 and sports source 973 of FIG. 10). Alternatively, the scheduling application may have found the Seinfeld related merchandise by a direct search of TV Guide Store source 709 based on request 1.

The scheduling application may also allow users to personalize the application by setting various display settings. The scheduling application may, for example, provide illustrative display setup page 2100 of FIG. 21 in response to the user selecting set up display option 127 of main menu page 100 (FIG. 4). The on-line scheduling application may also provide users with an opportunity to personalize the display settings of the on-line application. Users may, for example, set the primary text color, anchor text color, primary text font, anchor text font, primary text style, anchor text style, or any other suitable graphical attribute of the display screen. Users may also select anchor destinations. Users may, for example, elect to go to a program information page after selecting a listing, or may elect to go to some other suitable page. Any suitable approach for providing users with an opportunity to indicate anchor types and destination pages may be used. User may also indicate whether scheduling information for favorites (e.g., favorite program listings), get displayed at the top of results pages, or at the tops of sections within results pages (e.g., at the top of a results grid).

Figure 22:
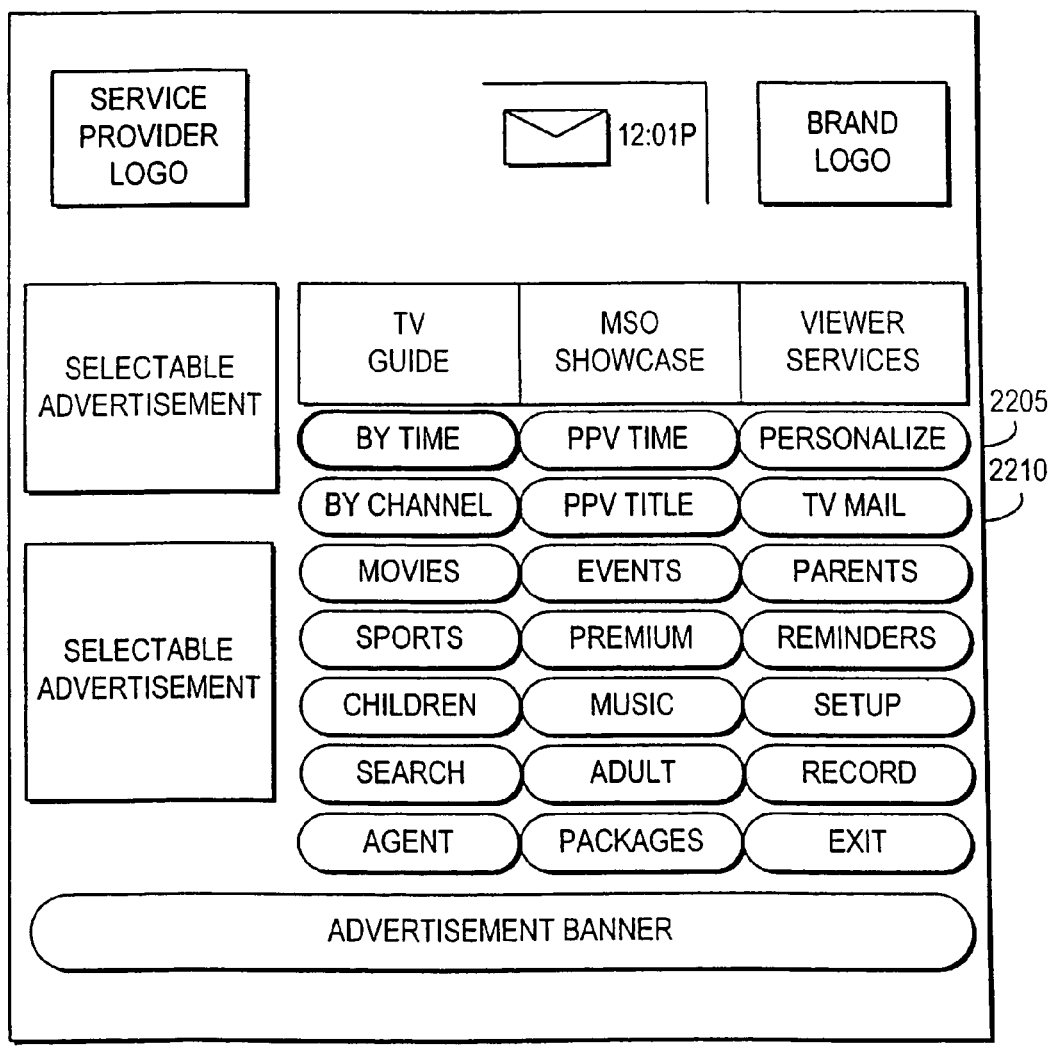
FIG. 22 shows an illustrative main menu page for an on-line television program guide in accordance with the principles of the present invention.

The features of the present invention may be incorporated into an on-line television program guide. In practice, the television-related features of the present invention may be most appropriate for incorporating into a program guide. An illustrative main menu page 2200 for an on-line program guide is shown in FIG. 22. Main menu page 2200 may include, for example, selectable options 2205 and 2210 for providing users with opportunities to personalize television-related information provided by the program guide and to access results of the personalization, respectively. If desired, entertainment-related features, social-activity-related features, and date book features may also be incorporated into an on-line television program guide to create an on-line scheduling application having traditional program guide features.

Figure 23:
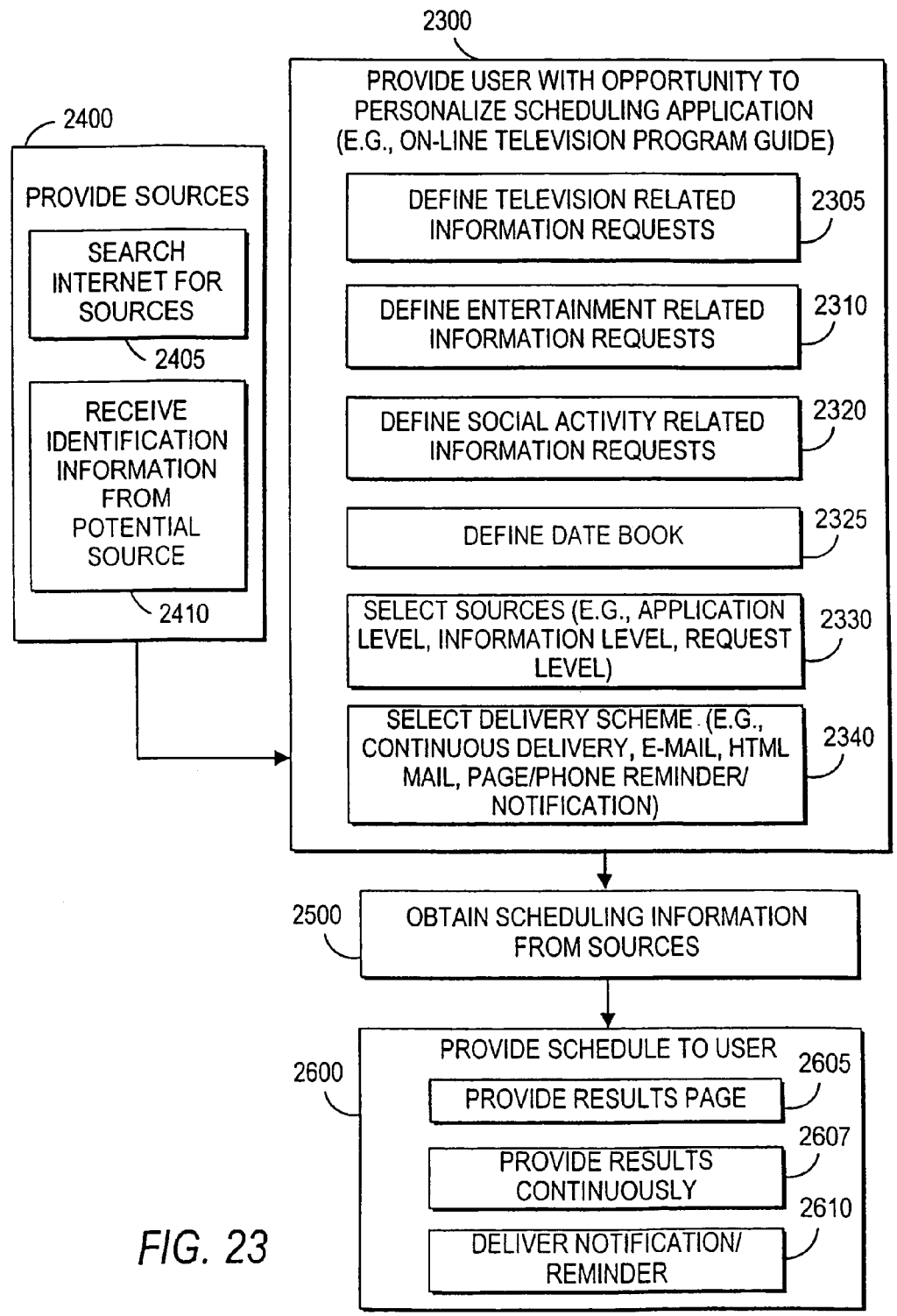
FIG. 23 is a flowchart of illustrative steps involved in operating the scheduling application system in accordance with the principles of the present invention.

FIG. 23 is a flowchart of illustrative steps involved in operating the on-line scheduling application system of the present invention. The on-line scheduling application provides the user with an opportunity to personalize the scheduling application at step 2300. The scheduling application may be, for example, a modified-on-line television program guide. Step 2300 may include providing users with opportunities to, for example, defined television-related information requests (step 2305), define entertainment-related information requests (step 2310), define social-activity-related information requests (step 2320), or define a date book (step 2325). Step 2300 may also include providing a user with an opportunity to select one or more sources (step 2330) and delivery schemes (step 2340). These steps may be performed separately or together.

Available sources are provided at step 2400. The scheduling application may, for example, search the Internet for one or more web sites from which the scheduling application may obtain scheduling information (step 2405). Alternatively, the scheduling application may obtain information that sufficiently identifies one or more web sites to the scheduling application so that the web sites may be used as sources of scheduling information (step 2410).

The scheduling application obtains scheduling information from the sources at step 2500. This may be performed using any suitable approach, depending on the type of source. The scheduling application may issue one or more suitable database requests to obtain scheduling information from databases maintained by scheduling system 19 or guide scheduling system 87. The scheduling application may obtain scheduling information using, for example, known web crawling and searching techniques. Alternatively, a central database maintained by scheduling system 19 may be updated by remote databases using a suitable database engine.

The scheduling application may provide the scheduling information to the user at step 2600. Scheduling information may be provided in one or more results pages (step 2605), but may be provided in any suitable markup language document or page that is delivered via the web or using some other on-line approach. In an on-line program guide for example, users may obtain personalized scheduling information from a TV Mail box (option 2210 FIG. 22). Scheduling information may also be provided to the user continuously (step 2607), or via one or more notifications or reminders (step 2610), depending on the delivery schemes selected at step 2340.

The foregoing is merely illustrative of the principles of this invention and various modifications can be made by those skilled in the art without departing from the scope and spirit of the invention.

What is claimed is:

1. A method for providing a user with personalized scheduling information for events, comprising:
receiving user input to select at least one social activity related information source from a plurality of social activity related information sources;
receiving user input to select at least one social activity related criteria from a plurality of social activity related criteria and assigning a value to the at least one social activity related criteria, wherein said assigning a value to the at least one social activity related criteria comprises assigning a value to each of venue, start time, and day of week;
determining personalized scheduling information for a social activity based on the at least one social activity related information source selected by the user and based on the user-assigned values to venue, start time, and day of week;
automatically entering the personalized scheduling information in the user's environment; and
updating the personalized scheduling information in the user's environment based on new information in the at least one social activity related information source selected by the user and based on the user-assigned values to venue, start time, and day of week.

2. The method of claim 1, further comprising:
receiving user input to select a delivery scheme for delivering the personalized scheduling information; and
delivering the personalized scheduling information to the user based on the delivery scheme selected by the user.

3. The method defined in claim 2, wherein receiving the user input to select the delivery scheme comprises receiving user input to select a continuous delivery scheme.

4. The method defined in claim 2, wherein the delivery scheme comprises a delivery scheme selected from the group of delivery schemes consisting of: e-mail, HTML mail, pager/digital phone reminder, and pager/digital phone notification.

5. The method defined in claim 1, further comprising receiving a user input to specify display settings for displaying the personalized schedule information.

6. The method defined in claim 1, further comprising maintaining a history of user preferences based on the user input.

7. The method defined in claim 6, further comprising generating reminders based on the history of user preferences.

8. The method defined in claim 1, wherein the at least one social activity related information source comprises an information source selected from the group of information sources consisting of: a museum database, a theater database, a sporting database, a church database, a hobbies database, and a web site.

9. The method defined in claim 1, wherein the determining the personalized scheduling information comprises determining the personalized scheduling information based on geographic location information.

10. The method defined in claim 1, wherein the determining the personalized scheduling information further comprises determining personalized scheduling information for a television program listing.

11. A system for providing a user with personalized scheduling information for events, the system comprising electronic processing equipment operable to:
- receive user input to select at least one social activity related information source from a plurality of social activity related information sources;
- receive user input to select at least one social activity related criteria from a plurality of social activity related criteria and to assign a value to the at least one social activity related criteria, wherein assigning a value to the at least one social activity related criteria comprises assigning a value to each of venue, start time, and day of week;
- determine personalized scheduling information for a social activity based on the at least one social activity related information source selected by the user and based on the user-assigned values to venue, start time, and day of week;
- automatically enter the personalized scheduling information in the user's environment; and
- update the personalized scheduling information in the user's environment based on new information in the at least one social activity related information source selected by the user and based on the user-assigned values to venue, start time, and day of week.

12. The system of claim 11, wherein the electronic processing equipment is further operable to:
- receive user input to select a delivery scheme for delivering the personalized scheduling information; and
- deliver the personalized scheduling information to the user based on the delivery scheme selected by the user.

13. The system of claim 12, wherein the delivery scheme comprises a continuous delivery scheme.

14. The system of claim 12, wherein the delivery scheme comprises a delivery scheme selected from the group of delivery schemes consisting of: e-mail, HTML mail, pager/digital phone reminder, and pager/digital phone notification.

15. The system of claim 11, wherein the electronic processing equipment is further operable to receive a user input to specify display settings for displaying the personalized schedule information.

16. The system of claim 11, wherein the electronic processing equipment is further operable to maintain a history of user preferences based on the user input.

17. The system of claim 16, wherein the electronic processing equipment is further operable to generate reminders based on the history of user preferences.

18. The system of claim 11, wherein the at least one social activity related information source comprises an information source selected from the group of information sources consisting of: a museum database, a theater database, a church database, a hobbies database, and a web site.

19. The system of claim 11, wherein the electronic processing equipment is further operable to determine the personalized scheduling information based on geographic location information.

20. The system of claim 11, wherein the personalized scheduling information further comprises a television program listing.

21. A non-transitory computer-readable medium for providing a user with personalized scheduling information for events, the non-transitory computer-readable medium having computer program instructions recorded thereon, executed by a computer processor for:
- receiving user input to select at least one social activity related information source from a plurality of social activity related information sources;
- receiving user input to select at least one social activity related criteria from a plurality of social activity related criteria and assigning a value to the at least one social activity related criteria, wherein said assigning a value to the at least one social activity related criteria comprises assigning a value to each of venue, start time, and day of week;
- determining personalized scheduling information for a social activity based on the at least one social activity related information source selected by the user and based on the user-assigned values to venue, start time, and day of week;
- automatically entering the personalized scheduling information in the user's environment; and
- updating the personalized scheduling information in the user's environment based on new information in the at least one social activity related information source selected by the user and based on the user-assigned values to venue, start time, and day of week.

22. The non-transitory computer-readable medium of claim 21, further comprising computer program instructions recorded thereon for:
- receiving user input to select a delivery scheme for delivering the personalized scheduling information; and
- delivering the personalized scheduling information to the user based on the delivery scheme selected by the user.

23. The non-transitory computer-readable medium of claim 22, wherein receiving the user input to select the delivery scheme comprises receiving user input to select a continuous delivery scheme.

* * * * *